(12) United States Patent
Teraoka et al.

(10) Patent No.: US 10,864,589 B2
(45) Date of Patent: Dec. 15, 2020

(54) MELTING TOOL CONTROLLER

(71) Applicant: Hakko Corporation, Osaka (JP)

(72) Inventors: Yoshitomo Teraoka, Osaka (JP); Satoshi Manda, Osaka (JP); Tomoo Takahara, Suita (JP)

(73) Assignee: HAKKO CORPORATION, Osaka (JP)

( * ) Notice: Subject to any disclaimer, the term of this patent is extended or adjusted under 35 U.S.C. 154(b) by 327 days.

(21) Appl. No.: 15/872,807

(22) Filed: Jan. 16, 2018

(65) Prior Publication Data
US 2018/0236582 A1    Aug. 23, 2018

Related U.S. Application Data

(60) Provisional application No. 62/566,653, filed on Oct. 2, 2017.

(30) Foreign Application Priority Data

Jan. 17, 2017  (JP) .................................... 2017-6073
Nov. 30, 2017  (JP) ................................ 2017-230237

(51) Int. Cl.
*B23K 3/03* (2006.01)
*B23K 1/00* (2006.01)
*B23K 3/02* (2006.01)

(52) U.S. Cl.
CPC ............ *B23K 3/033* (2013.01); *B23K 1/0016* (2013.01); *B23K 3/027* (2013.01)

(58) Field of Classification Search
CPC .................................. B23K 3/033; B23K 3/00
USPC ......................................................... 219/233
See application file for complete search history.

(56) References Cited

U.S. PATENT DOCUMENTS 6,550,669 B1 *   4/2003   Walz ...................... B23K 1/018
                                                                   228/19

FOREIGN PATENT DOCUMENTS

| JP | 63-137575 | A |   | 6/1988 |
|----|-----------|---|---|--------|
| JP | H04288966 | A |   | 10/1992 |
| JP | 11-138255 | A |   | 5/1999 |
| JP | 2000075912 | A | * | 3/2000 |
| JP | 2000075912 | A |   | 3/2000 |
| JP | 4073355 | B2 |   | 4/2008 |
| JP | 2014/195827 | A |   | 10/2014 |

OTHER PUBLICATIONS

Translation of JP 2000-75912 (Year: 2003).*

* cited by examiner

*Primary Examiner* — Lauren A Crane
(74) *Attorney, Agent, or Firm* — Squire Patton Boggs (US) LLP

(57) ABSTRACT

A melting tool control apparatus comprises a drive mechanism, a melt processing assembly configured to perform a melt process, a receiving module that receives input of three-dimensional coordinate information of a first point where the melt process is to be performed and input of a position information indicating a position different from the first point, and a process control module configured to control the melt processing assembly to perform the melt process when the distal end is at the first point.

15 Claims, 12 Drawing Sheets

P.W.B. Information
xxxxxx — A1

| Sequence | Process mode | Class field | Position Information | | | Direction | Condition | Recede Mode | ... |
| | | | X | Y | Z | θ | | | |
| --- | --- | --- | --- | --- | --- | --- | --- | --- | --- |
| 1 | Point soldering ▶ | Start point | x12 | y12 | z12 | θ12 | Pre-process condition | | ... |
| | | End point | x11 | y11 | z11 | θ11 | Main process condition | Start point | ... |
| | | | | | | | After process condition | | ... |
| 2 | Point soldering ▶ | Start point | x22 | y22 | z22 | θ22 | Pre-process condition | | ... |
| | | End point | x21 | y21 | z21 | θ21 | Main process condition | Upward (z0) | ... |
| | | | | | | | After process condition | | ... |
| 3 | Drag soldering ▶ | Start point | x31 | y31 | z31 | θ31 | Pre-process condition | | ... |
| | | End point | x32 | y32 | z32 | θ32 | Main process condition | Upward (zi) | ... |
| | | | | | | | After process condition | | ... |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |

Buttons: Trial Operation (B6), New (B1), Open (B2), Save (B3), Run (B4), Close (B5)

Window W1, columns A1, A2

FIG. 4

MELTING TOOL CONTROLLER

CROSS-REFERENCE TO RELATED APPLICATION

This application claims the benefit of U.S. Provisional Application No. 62/566,653, filed Oct. 2, 2017, Japanese Application No. 2017-6073, filed Jan. 17, 2017, and Japanese application No. 2017-230237 filed, Nov. 30, 2017, the entire contents of which applications are hereby incorporated by reference.

FIELD

Briefly and in general terms, the present invention relates to a melting tool control apparatus.

BACKGROUND

A technique for controlling a melt process of metals such as solder using a soldering iron is known art. For example, Japanese Patent No. 4073355 (Patent Document 1 herein) shows a tip of the soldering iron held in an inclined working angle by an automated device, and after the tip of the soldering iron is moved in the vicinity of a soldering target, compressed air is supplied and the tip of the soldering iron is moved downward in the axial direction using an air cylinder. Soldering is performed with the soldering tip abutting against the soldering subject.

Japanese Patent Publication No. 1992-288966 (Patent Document 2 herein) disclose a technique for controlling a soldering operation that uses the tip of the soldering iron which is held by an articulated robot. Specifically, considering the warpage that occurs in the soldering subject of the substrate, rather than teaching the three-dimensional spatial point of the soldering target, Patent Document 2 teach the three-dimensional spatial point P3 vertically above, and spatial point P4 vertically below the soldering subject. Then, during movement from P3 to P4, it is detected whether the tip of the soldering iron contacts the substrate based on a temperature change of the tip. A soldering operation is performed when the tip is detected to have contacted the substrate, that it contacted the substrate.

ISSUES TO BE SOLVED

Relating to the technique of Patent Document 1, the moving direction of the soldering tip is dependent on the mechanical settings of the air cylinder. Thus, in a sequence to move the soldering tip to the target position of the desired soldering process, the operator must accurately adjust the mechanical settings of the air cylinder, and set the position of the soldering tip not to the soldering target position but to the position when starting the operation of the air cylinder. That is, the technique of Patent Document 1 does not allow operator to directly set to the target position, requiring a complicated setting work.

The technique of Patent Document 2 moves the soldering tip substantially perpendicular to the upper surface of the substrate and hits the substrate surface to correct position of warping of the substrate. However, if the soldering position was located between a component's lower surface and the substrate upper surface, the soldering tip will likely hit the component's upper surface before reaching the soldering position. Therefore, there are many types of components which are not suitable with the technique described in Patent Document 2.

In a sequence to move the soldering tip to the soldering position, it is also conceivable to move the soldering tip inclined to the upper surface of the substrate like in the technique of Patent Document 1. However, in this case, the operator needs to set both spatial points P3 and P4. If setting both of spatial points P3 and P4 is to be done, since the soldering position must exist on the same line having spatial points P3 and P4 as the start point and the end point, the operator will be required to repeatedly set spatial points P3 and P4. Further, if the jig supporting position of substrate is changed and moved after setting spatial points P3, P4, the operator must set both spatial points P3, P4 all over again.

The technique of Patent Document 2 detects the soldering tip reaches the soldering position based on a temperature change of the soldering tip. To reliably detect the temperature change, the tip needs to be pressed with pressure against the substrate or the element. This means that there is potentially a high risk of damage to the soldering tip. Especially when the soldering tip is moved while inclined, the risk of bending the soldering tip increases. Furthermore, the technique of Patent Document 2 is not desirable when it is undesirable to have strong contact between the soldering tip and the substrate or component.

The technique of Patent Documents 1 and 2 relates to soldering iron. However, the problems described above (i.e., complexity of the adjustment or setting work, moving the soldering tip to the soldering position with high accuracy, and the risk of damage), are common to heating tools for use with bonding materials which melt under heating. Such heating tools include a suction device for suctioning and removing bonding material adhering to the substrate, and a hot air device for blowing hot air to onto bonding material.

The present invention has been made in view of the above problems. In non-limiting aspects, it provides a molten control device which may address the above problems.

SUMMARY

The present invention is directed to a melting tool control apparatus and a non-transitory computer readable medium.

In aspects of the invention, a melting tool control apparatus comprises a drive mechanism configured to move an distal end of a heating tool, a melt processing assembly configured to perform a melt process using the distal end, a receiving module that receives input of three-dimensional coordinate information of a first point where the melt process is to be performed and input of a position information indicating a position different from the first point, and a process control module configured to control the melt processing assembly to perform the melt process when the distal end is at the first point, wherein the drive mechanism is configured to move the distal end between the position indicated by the position information and the first point.

In aspects of the invention, a non-transitory computer readable medium stores instructions, which when executed by a computer, causes the computer to execute a control process for controlling a distal end of a heating tool to perform a melt process, wherein the control process comprises receiving input for three-dimensional coordinate information of a first point where the melt process is to be performed, receiving input for a position information indicating a position different from the first point, using the input to move the distal end between the position indicated by the position information and the first point, and performing a melt process when the distal end is at the first point.

In non-limiting aspects, by inputting the three-dimensional coordinate information for the first to be a target position of the melt process, it is possible to have the melt process performed at the first point. Further, without changing the first point, it is possible to have the position information entered so the distal end of the heating tool follows a proper moving path.

For example, say if the target position of the melt process exists between the component's lower surface and the substrate surface. In this case, by entering a position information indicating a spaced-away position that spaced apart from the target position in an inclined attitude with respect to the surface of the substrate, it is possible to move the distal end between the target position and the spaced-away position, in an inclined attitude relative to the substrate surface. Thus, the distal end of the heating tool can move in the path which does not hit the component's upper surface. Thus, it may be possible to reach the target position of the melt process desired by the operator with high accuracy.

In non-limiting aspects, unlike conventional systems, the three-dimensional coordinate information for the first point, which is target position of the melt process, can be set directly and does not require adjustment of each of the set points. Therefore, even when the target position of the melt process is changed due to the movement of the support position of the substrate by the jig or the like after setting the target position of the melt process, the user may directly set coordinates for the target position of the melt process. Thus, may be possible to eliminate complexity of setting operation of the target position of the melt process.

In non-limiting aspects, since the first point is a position where the melt process is performed, the driving mechanism stops the distal end of the heating tool at the first point, under the control of the process control module. Therefore, the distal end of the heating tool is less likely to receive large impact force. This reduces the risk of damaging the distal end of the heating tool.

In a non-limiting aspect, it may be preferable that the position information is three-dimensional coordinate information of a second point that is different from the three-dimensional coordinate information of the first point.

In the above aspect, by entering three-dimensional coordinate information of the second point, the distal end of the heating tool can be moved between the first point and the second point.

In a non-limiting aspect, the position information includes distance information indicating a distance from the first point and direction information indicating a direction from the first point, and the process control module determines a position for the second point based on the distance information and the direction information, causes the drive mechanism to move the distal end from the determined position of the second point, and causes the drive mechanism to move the distal end to the first point.

In the above aspect, by entering three-dimensional coordinates for the first point, distance information from the first point, and direction information from the first point, the distal end of the heating tool can be moved from the second point on three-dimensional coordinates defined from the entered information.

In non-limiting aspects, if the heating tool is a soldering iron, and it may be preferable that the melt processing assembly performs a first melt process during which a first supply amount of solder is supplied to the distal end when the end portion reaches the first point after moving away from the second point.

In the above aspect, when the distal end of the soldering iron has reached the first point, the first melt process (for example, principal melt process) is performed. Accordingly, the distal end of the soldering iron at the first point can melt the first amount of solder, and perform soldering at the first point as the target position.

Further, the process control module may cause the melt processing assembly to perform a second melt process (for example, preparatory melt process) to provide a second amount of solder less than the first amount to the distal end when the distal end is at the second point.

In the above aspect, in advance of performing the first melt process at the first point as a target position, the second melt process (preparatory melt process) is performed. Thus, when the distal end of the soldering iron has reached the first point, the second amount of solder melted at the distal end of the soldering iron can touch and blend onto the first point before starting the first melt process (principal melt process). As a result, it is possible to improve the soldering accuracy at the first point as the target position by the first melt process (principal melt process).

In a non-limiting aspect, after completion of the first melt process (principal melt process), the process control module may cause the driving mechanism to move the distal end to a certain recede position away from the surface of the substrate on which the melt process is performed.

In the above aspect, the distal end of the soldering iron is moved from the first point to the recede position after completion of the first melt process (principal melt process). This allows the first solder amount which was melted during the first melt process (principal melt process) is cool and become secured to the first point.

In a non-limiting aspect, the process control module may cause a third melt process (finishing melt process) to be performed during which a third amount of solder, less than the first amount, to be supplied to the distal end while keeping the distal end at the first point after completion of the first melt process (principal melt process), and cause the driving mechanism to move the distal end to a certain recede position after the completion of the third melt process, the recede position being located away from the surface of the substrate on which the melt process was performed.

In the above aspect, after the first melt process (principal melt process) at the first point as the target position, a third melt process to supply the third amount of solder to the distal end is further performed while the distal end remains at the first point. As a result, it may be possible to improve the appearance of the solder adhered to the first point, such as giving a smooth gloss appearance to the solder.

In a non-limiting aspect, the melting tool control apparatus further comprises a process selection module that receives a selection between a first process mode in which a solder point is formed at a certain point on a substrate and a second process mode in which a line segment of solder is drawn on a substrate. When the process selection module receives the selection of the first process mode, the receiving module receives the first point as an end point to which the distal end is moved and where a solder point is formed, and receives the second point as a start point to which the distal end is moved. When the process selection module receives the selection of the second process mode, the receiving module receives the first point as a start point to which the distal end is moved and where drawing of the line segment is started, and receives the second point as an end point to which the distal end is moved and where drawing of the line segment is ended.

In the above aspect, selection of the first process mode allows entering of the first point as the end point to which a solder point is to be formed, and allows entering of position information for the second point from which the distal end will be moved to the first point. Further, selection of the second process mode allows entering of the first point as the start point of the line segment of solder to be drawn on the substrate, and allows entering of position information for the second point as the end point of the line segment.

In the above aspect, the selection of forming a solder point or drawing a line segment is possible, and when either one is selected, the information required is made common to the start and end points for moving the distal end to form a solder point or draw a line segment.

In a non-limiting aspect, the melting tool control apparatus comprises a recede selection module that receives selection between a first recede mode for returning the distal end to the second point after the principal melt process, and a second recede mode for moving the distal end in a direction perpendicular to and away from a surface of a substrate. When the recede selection module receives the selection of the first recede mode, the process control module controls the drive mechanism to return the distal end to the second point after the principal melt process. When the recede selection module receives the selection of the second recede mode, the process control module controls the drive mechanism to move the distal end in the perpendicular direction after the principal melt process.

In the above aspect, by selecting the first recede mode, the distal end of the soldering iron can be returned to the second point after the first melt process (principal melt process), which is where it was positioned before performing the first melt process. This may reduce the risk of the distal end hitting an obstacle. By selecting a second recede mode, the distal end of the soldering iron can be moved in a direction perpendicular after completion of the first melt process (principal melt process). Thus, the molten solder can be pulled in the perpendicular direction by the distal end, which may reduce the occurrence of copper exposure, also known as a "red-eye" defect.

In a non-limiting aspect, the heating tool is a desoldering device for suctioning and removing bonding material, and when the distal end is at the first point, the process control module controls the melt processing assembly to generate a suction force at the distal end.

In the above aspect, when the distal end of the desoldering device is at the first point, suction force is generated at the distal end of the desoldering device. Thus, it is possible to melt, suction, and remove bonding material (such as solder) at the first point using the distal end of the desoldering device.

In a non-limiting aspect, the heating tool is a hot air device configured to discharge hot air at a temperature that melts bonding material, and when the distal end is at the first point, the process control module controls the melt processing assembly to discharge hot air from the distal end.

In the above aspect, when the distal end of the hot air device is at the first point, hot air is discharged out from the distal end of the hot air device. Thus, bonding material (such as solder) at the first point may be melted with the hot air discharged from the distal end of the hot air device.

In a non-limiting aspect, the heating tool is secured to an arm of a robot that moves the arm along a vertical axis extending in a vertical direction and along a horizontal axis extending in a horizontal axis, and the first point is defined by coordinates on the vertical and horizontal axes.

In the above aspect, unlike conventional systems, it may be possible to enter three-dimensional coordinate information for the first point as the target position, and enter the position information for a spaced-away position located spaced away from the substrate with the heating tool at an inclined attitude relative to the substrate, and then move the distal end of the heating tool held by the arm of the robot moving in orthogonal vertical and horizontal axes, where the movement is between the spaced-away position and the target position, and is performed without the use of an air cylinder.

In a non-limiting aspect, the heating tool is held by the arm in an inclined attitude with respect to a surface of a substrate.

In the above aspect, even when the target position of the melt process exists between the component's bottom surface and the surface of the substrate, by entering the three-dimensional coordinate information of the first point as the target position and entering the position information of the spaced-away position with an inclined attitude of the heating tool relative to the surface of the substrate, it is possible to move the distal end of the heating tool, while at an inclined attitude relative to the substrate surface, between the spaced-away position spaced and the target position. This occurs while the distal end of the heating tool held at the inclined attitude by an arm of a robot moving along from the vertical and horizontal axes. Thus, it is possible for the distal end to be moved to the target position following a path that will not hit the component's upper surface.

In a non-limiting aspect, melting control apparatus may further include an operation receiving module that receives an execution instruction to perform a main operation that includes moving the distal end to perform the melt process or an execution instruction to perform a trial operation that includes moving the distal end without performing any melt process, and an adjustment request receiving module that accepts a request to change a moving speed of the distal end from a previously set speed to an adjusted speed for use during the trial operation or the main operation. When the adjustment request receiving module accepts the request, and then the operation receiving module receives the execution instruction to perform the trial operation or the main operation, the drive mechanism uses the adjusted speed to move the distal end.

In the above aspect, by inputting an execution instruction of trial operation, it is possible to move the distal end without performing any melt process. This makes it possible to confirm whether or not a problem, such as a collision of the distal end with a component on a substrate, will occur during actual melt processing.

In the case where the above problem arises, the user may reduce the moving speed of the distal end from a previously set nominal value that would normally be used during melt processing. Accordingly, the tip portion is moved at the reduced speed without performing any melt process, which may allow the user to easily understand the above problem in detail. Once the problem is believed to have been solved, the user may increase the movement speed to one that is greater than the previously set nominal value. Accordingly, the tip portion is moved at an increased speed without performing any melt process, which may allow the user to promptly confirm that the problem has been solved.

Further, in the above aspect, the user may reduce the movement speed of the distal end from a previously set nominal speed value and then run an actual melt process using the reduced speed. This can make it possible for the user to determine whether a problem, such as adhesion of molten metal to components on the substrate in the vicinity of the distal end, will occur or not when the same melt process is performed at the previously set nominal speed value.

In a non-limiting aspect, when there is a large number of target positions in the melt process, the user may increase the moving speed of the distal end above the previously set nominal speed value and then run the melt process. In this aspect, it may be possible to rapidly carry out the melt process.

In a non-limiting aspect, the adjustment request receiving module accepts the request to change the moving speed for one or more routes, the routes including a first route from a current position of the distal end to the start point, a second route from the start point to the end point, and a third route from the end point to a recede position located at a distance and spaced away from a surface of the substrate on which the melt process is performed, and the drive mechanism moves the distal end at the adjusted speed in the one or more routes for which the adjustment request receiving module accepted the request to change the moving speed.

In the above aspect, a route in the movement speed of the distal end is changed is selected as an adjustment target route. This makes it possible to move the distal end in a desired route at a reduced or increased speed reduced speed during a trial operation in which no melt process is performed or during a main operation in which a melt process is actually performed.

EFFECT OF THE INVENTION

In non-limiting aspects, a melting tool control apparatus is provided which may solve the complexity of setting operation of the target position of the melt process, increase accuracy in reaching the target position, and reduce the risk of damaging the distal end of the heating tool.

BRIEF DESCRIPTION OF THE DRAWINGS

FIG. 4 shows an example editing operation screen of information relating to the control of the melt process.

DETAILED DESCRIPTION

Figure 1:
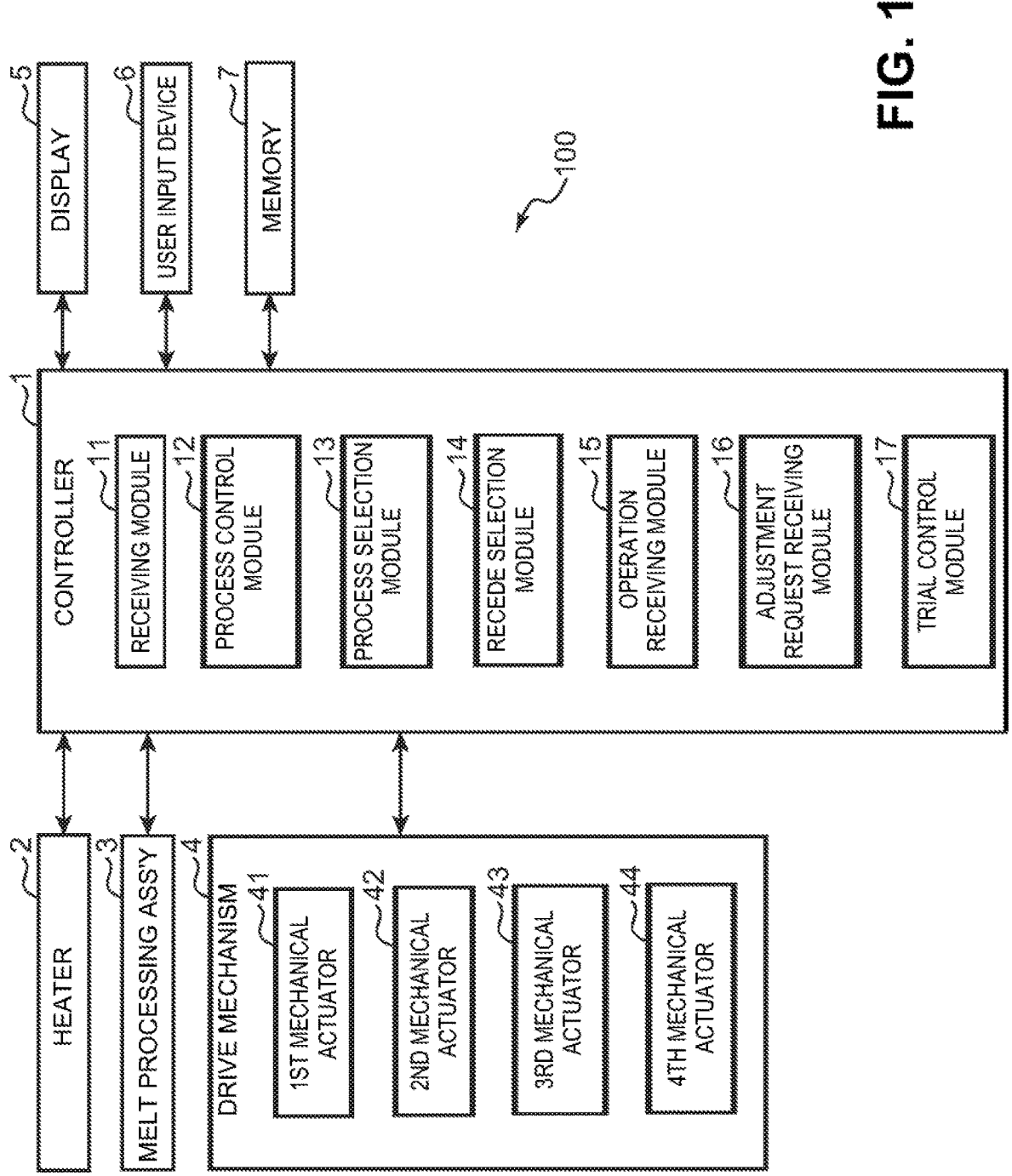
FIG. 1 is a block diagram showing a functional configuration of an example melting tool control apparatus.

Hereinafter, embodiments of the present invention will be described with reference to the drawings. The same reference numerals are used for the same elements in each of the drawings.

(Functional Configuration)

Figure 2:
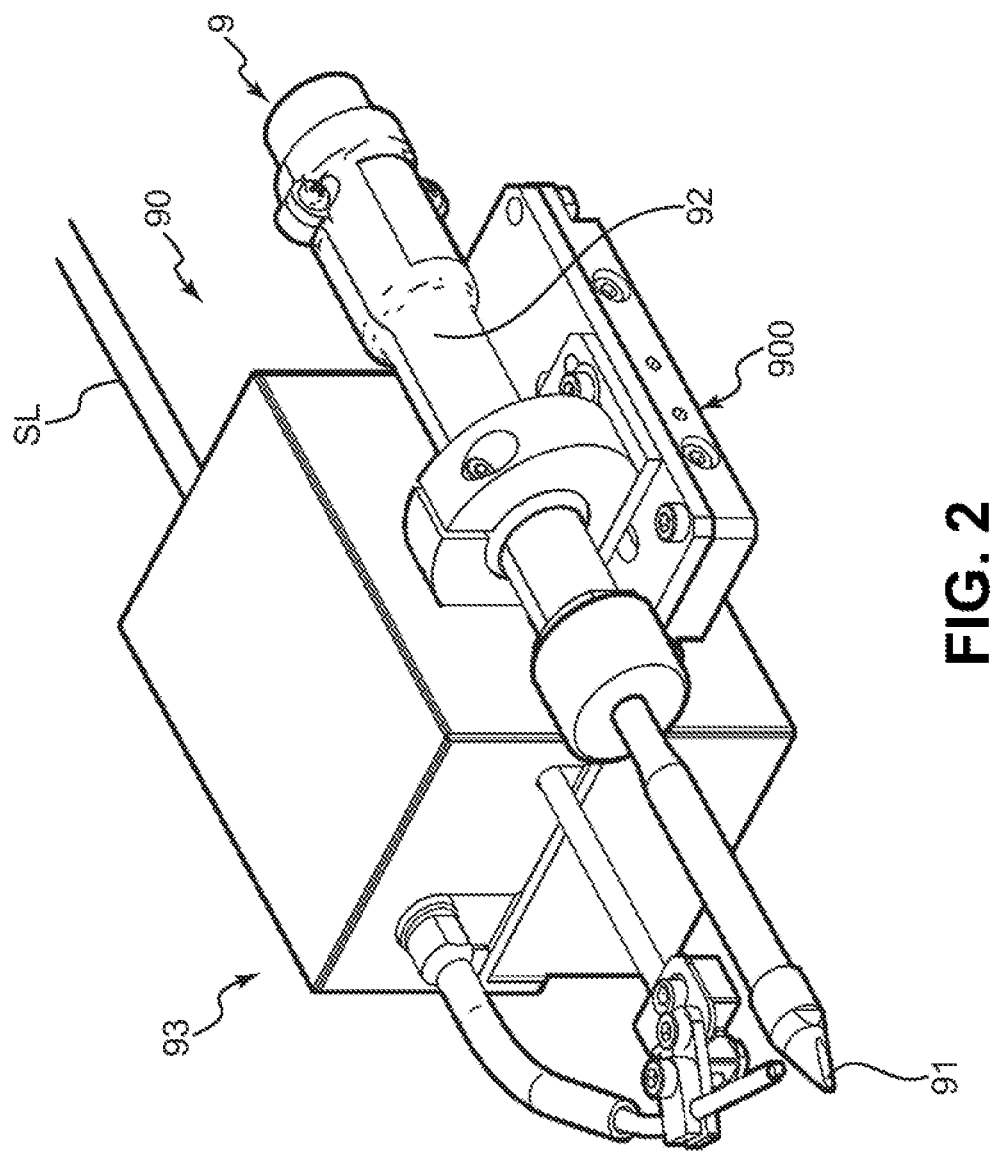
FIG. 2 is a perspective view of an example soldering assembly.
Figure 3:
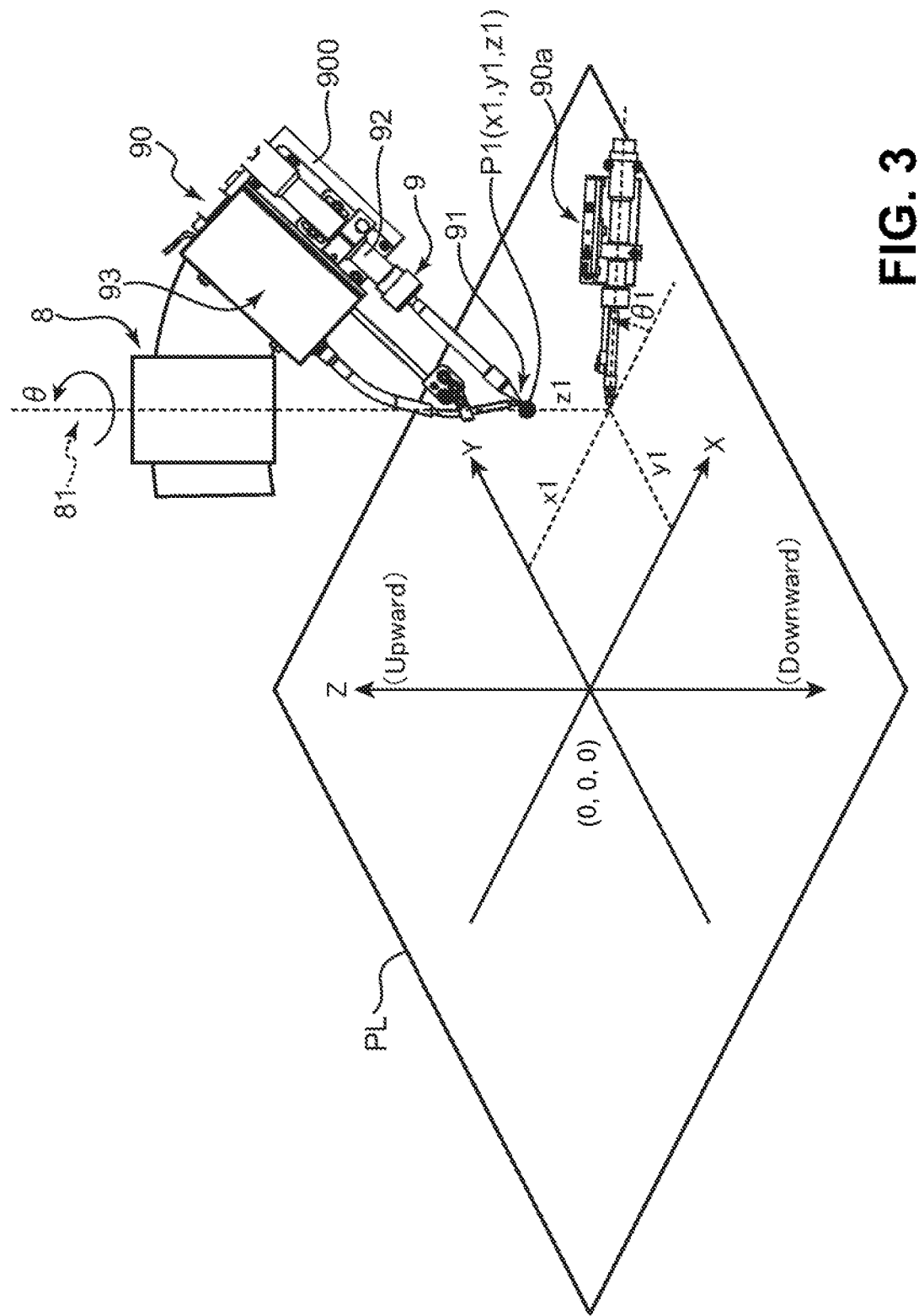
FIG. 3 is a three-dimensional diagram showing the relationship between the substrate surface and three-dimensional coordinates.

FIG. 1 is a block diagram showing an example of the functional configuration of melting tool control apparatus 100. FIG. 2 is a perspective view of soldering assembly 90. FIG. 3 shows the relationship between substrate surface PL and three-dimensional coordinates.

As shown in FIG. 1, melting tool control apparatus 100 includes heater 2, melt processing assembly 3, drive mechanism 4, display 5, user input device 6, memory 7, and controller 1.

Heater 2 heats distal end 91 (for example, a soldering iron tip) of heating tool 9 (for example, a soldering iron) shown in FIG. 2 to a predetermined temperature. Timing and temperature of heating distal end 91 by heater 2 is controlled by process control module 12 explained below.

A melt process is executed by using distal end 91 of heating tool 9. In the melt process, melt processing assembly 3 supplies a predetermined amount of solder SL to distal end 91 of heating tool 9 heated by heater 2. The timing and amount of solder SL supplied to distal end 91 of heating tool 9 in the melt process by melt processing assembly 3 is controlled by process control module 12 explained below.

Heater 2 can be a coil heater or the like made from metal wire, disposed inside a tip-heater integrated assembly inserted in body 92 of heating tool 9 provided in soldering assembly 90. Melt processing assembly 3 is formed from solder feeder mechanism 93 provided in soldering assembly 90. Solder feeder mechanism 93 is mechanism known in the art as being capable of feeding solder SL that is feed from a reel (out of view in the figures). For example, feeder mechanism 93 can include electric motors that grip the solder SL in the form of a solder wire, and pushes the solder wire toward distal end 91. The electric motors in feeder mechanism 93 operate under the control of process control module 12.

Soldering assembly 90 includes tool base 900 (FIGS. 2 and 3) fixed to arm 8 of drive mechanism 4. Drive mechanism 4 can be part of a four-axis drive robot. Heating tool 9 and solder feeder mechanism 93 are coupled to tool base 900. Thus, heating tool 9 and solder feeder mechanism 93 move integrally with the movement of tool base 900 which is fixed to arm 8. For example, heating tool 9 and solder feeder mechanism 93 move together with and to the same extent as tool base 900. In this way, melt processing assembly 3 can supply solder SL to distal end 91 while distal end 91 is moving.

Referring to FIG. 3, drive mechanism 4 (FIG. 1) moves distal end 91 of heating tool 9 connected to tool base 900, to a certain point (for example, P1 (x1, y1, z1)) by moving arm 8. P1 can be defined with three-dimensional coordinates.

The three-dimensional coordinates may correspond to three axes: an X-axis, which is an example of a horizontal axis on substrate surface PL; a Y-axis, which is an example of another horizontal axis on substrate surface PL, and which is orthogonal (perpendicular) to the X-axis; and a Z-axis, which is an example of a vertical axis, and which is perpendicular to substrate surface PL and orthogonal to both the X-axis and Y-axis. Substrate surface PL will be subject to a melt process.

Hereinafter, a direction along the X-axis is referred to as an X-axis direction, a direction along the Y-axis is referred to as a Y-axis direction, and a direction along the Z-axis is referred to as a Z-axis direction. A direction along the Z-axis away from substrate surface PL is referred to as upward, and a direction along the Z-axis toward substrate surface PL is referred to as downward. Further, a larger Z coordinate value refers to a position that is further away from substrate surface PL, and a smaller Z coordinate value refers to a position that is closer to substrate surface PL.

Heating tool 9 is secured to tool base 900 in such a way that distal end 91 of heating tool 9 is positioned along an imaginary extension line coincident with rotational axis 81 of arm 8. Rotational axis 81 corresponds to the Z-axis in the illustrated example of FIG. 3. As shown in FIG. 3, heating tool 9 is held inclined with respect to substrate surface PL by arm 8 of drive mechanism 4 (FIG. 1). When drive mechanism 4 rotates arm 8 in angular direction θ (counterclockwise) about rotation axis 81, drive mechanism 4 effectively rotates heating tool 9 in angular direction θ while distal end 91 of heating tool 9 remains positioned at point P1 on rotational axis 81. Reference numeral 90a in FIG. 3 designates an imaginary downward projection of soldering assembly 90 onto substrate surface PL. The imaginary downward projection illustrates that heating tool 9 is located at an angle θ1 from the X-axis. Although angular direction θ is defined as counterclockwise in the illustrated example of FIG. 3, it could be defined as clockwise instead.

Drive mechanism 4 comprises first mechanical actuator 41, second mechanical actuator 42, third mechanical actuator 43 and fourth mechanical actuator 44.

First mechanical actuator 41 moves distal end 91 along the X-axis to an X coordinate position (for example, x1) specified by process control module 12 described later. First mechanical actuator 41 includes a drive motor, pneumatic cylinder, and/or other type of actuator that moves arm 8 along the X-axis. Additionally or alternatively, first mechanical actuator 41 includes a drive motor, pneumatic cylinder, and/or other type of actuator that moves a table (on which the substrate is placed) along the X-axis.

Second mechanical actuator 42, moves distal end 91 along the Y-axis to a Y coordinate position (for example, y1) specified by process control module 12 described later. Second mechanical actuator 42 includes a drive motor, pneumatic cylinder, and/or other type of actuator that moves arm 8 along the Y-axis. Additionally or alternatively, second mechanical actuator 42 includes a drive motor, pneumatic cylinder, and/or other type of actuator that moves a table (on which the substrate is placed) along the Y-axis.

Third mechanical actuator 43, moves distal end 91 along the Z-axis to a Z coordinate position (for example, z1) specified by process control module 12 described later. Third mechanical actuator 43 includes a drive motor, pneumatic cylinder, and/or other type of actuator that moves arm 8 along the Z-axis.

Fourth mechanical actuator 44, rotates heating tool 9 in angular direction θ around point P1 occupied by distal end 91 so angle θ1 is formed between the X-axis and the center axis of heating tool 9. Angle θ1 is specified by process control module 12 described later. In more general terms, rotation of heating tool 9 in angular direction θ forms an angle θx between the X-axis and the center axis of heating tool 9. Such rotation can be referred to herein as adjusting the direction of heating tool 9 to angle θx. Fourth mechanical actuator 44 includes a drive motor, pneumatic cylinder, and/or other type of actuator that rotates arm 8 in angular direction θ about rotation axis 81.

Display 5 displays an operation screen of melting tool control apparatus 100. Display 5 can be a liquid crystal display or other type of device that is configured to display characters and/or graphics. User input device 6 allows the user to interact with the operation screen. User input device 6 can be a touch panel, a keyboard for inputting information, a computer mouse to move a cursor on the operation screen and click a graphic button displayed on the operation screen, and/or other type of device that allows the user to provide input to a computer. Memory 7 stores various information. Memory 7 is a data storage device, examples of which include without limitation, an HDD (Hard Disk Drive), SSD (Solid State Drive), and the like.

Controller 1 controls or functions as each module provided in melting tool control apparatus 100. Controller 1 can be a microcomputer including a CPU (central processing unit), RAM (random access memory) and ROM (read only memory). The CPU may execute a control program stored in ROM or in an external data storage device such as a DVD, CD, etc., to enable controller 1 to function as receiving module 11, process control module 12, process selection module 13, recede selection module 14, operation receiving module 15, adjustment request receiving module 16, and trial control module 17.

Receiving module 11 receives input data for positioning distal end 91. Examples of input data include three-dimensional coordinates for a first point and a second point different from the first point.

Process control module 12 controls drive mechanism 4 to move distal end 91 to the second point and the first point, and controls melt processing assembly 3 to perform a certain melt process when distal end 91 is at the first point. That is, process control module 12 controls melt processing assembly 3 to feed solder SL to distal end 91, in order to perform the melt process.

Process selection module 13 allows for user selection of a solder mode. Solder modes include a point soldering and a drag soldering. Point soldering (an example of a first processing mode) forms a point solder confined to a certain point on the substrate. Drag soldering (an example of a second processing mode) draws a line segment of solder on the substrate.

Recede selection module 14 allows for user selection of options on how distal end 91 is moved after melt processing. Options include start point recede mode and upward recede mode. With start point recede mode (an example of a first recede mode), distal end 91 returns to its start point position after melt processing. The start point position is the position of distal end 91 before melt processing. With upward recede mode (an example of a second recede mode), distal end 91 is moved upward along the Z-axis after melt processing.

Operation receiving module 15 receives a user instruction to execute a trial operation to move distal end 91 without performing the main operation or the melt processing. During the trial operation, distal end 91 moves according to coordinates and other settings that were previously defined without any solder being supplied and melted. This is different from actual operation in which distal end 91 moves according to coordinates and other settings that were previously defined while solder is supplied and melted.

Adjustment request receiving module 16 accepts a user request to reduce or increase the moving speed of distal end 91 from a set value. Specifically, adjustment request receiving module 16 receives, as the request, that at least one of the traveling routes of distal end 91 (described later) is selected as an adjustment target route.

When operation receiving module 15 receives an instruction to execute a trial operation, trial control module 17 controls drive mechanism 4 to reduce or increase the moving speed of distal end 91 below or above a set value in the adjustment target route selected via adjustment request receiving module 16.

(How Inputs and Selections are Received)

Hereinafter, a method of accepting user input and selection in receiving module 11, process selection module 13, recede selection module 14, operation receiving module 15, and adjustment request receiving module 16 will be described in detail.

Figure 11:
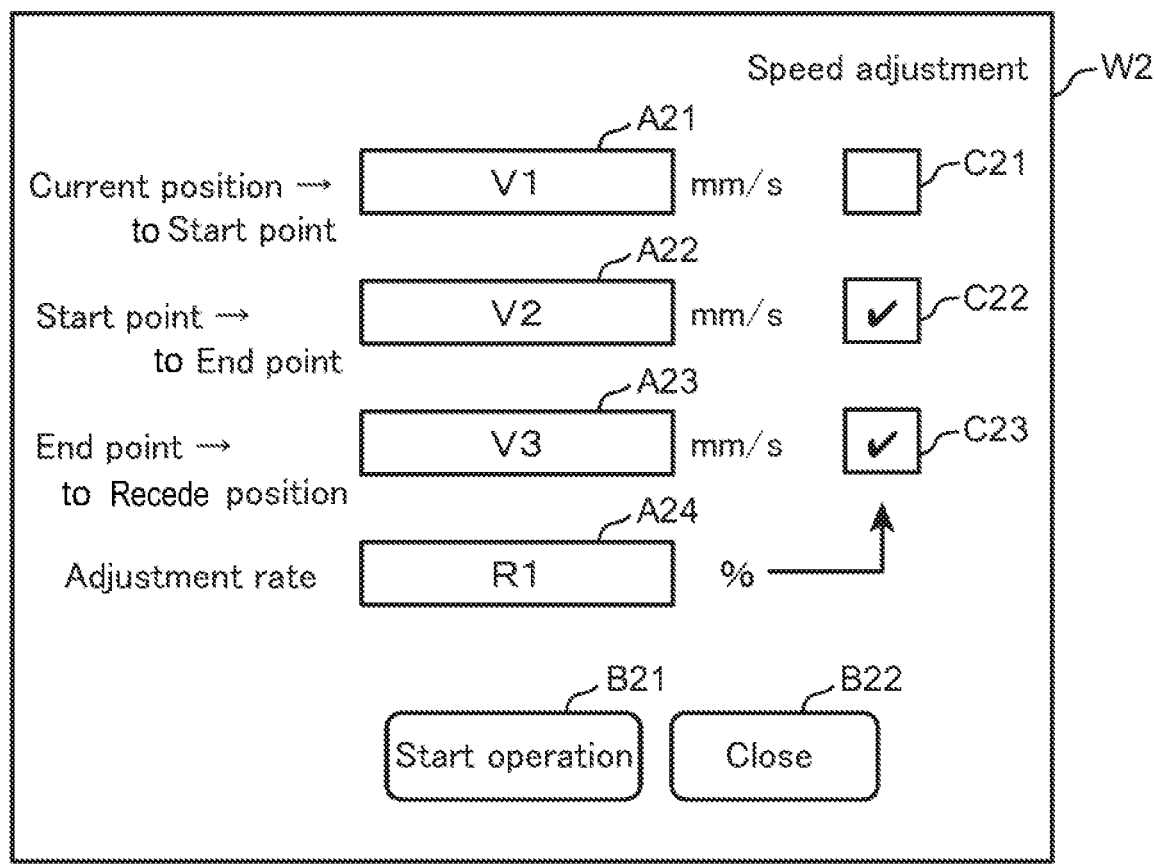
FIG. 11 is a diagram showing an example moving speed editing operation screen.

FIG. 4 is a diagram showing an example of an edit operation screen W1 of information relating to control of melt processing. FIG. 11 is a diagram showing an example of the moving speed edit operation screen W2. Specifically, process selection module 13, recede selection module 14, operation receiving module 15, and adjustment request receiving module 16 are configured to receive input or select operation via operation screens W1 and W2. As shown in FIG. 4, edit operation screen W1 includes edit fields A1 and A2 and five graphic button keys B1 to B5.

Edit field A1 is the field for editing information about a substrate which is the target of the melt process. In FIG. 4, the term xxxxxx is a generic placeholder for illustration only, and an alphanumeric term such as "PCB 3x948a" or other term may actually be entered in edit field A1.

Edit field A2 is the field for editing information used for control of a melt process to be performed at each target position on the substrate specified in edit field A1. Edit field A2 includes multiple user entry fields, namely: a sequence display field, a process mode selection field, a class field, a position information edit field, an angular direction edit field, a condition edit field, and a recede mode selection field, and potentially more.

The sequence display field (far left column) displays the sequential order in which melt processes will be performed at target positions. In this example, the sequential order is specified by numbers 1, 2, 3, etc. Number 1 is used for the first melt process to be performed, number 2 is used for the next melt process to be performed, and so on. Each melt process is either a point soldering process or a drag soldering process.

The process mode selection field (second column from left) allows the user to specify each melt process as either point soldering or drag soldering. Point soldering deposits a point of solder at only a single point on the substrate. Drag soldering deposits a solder line segment on the substrate.

The class field (third column from the left) indicates whether the position information in that row is for a start point or an end point. Start and end points define the movement of distal end 91 to a target position. A target position is where solder is to be deposited.

The position information edit field (corresponding to columns labeled X, Y, and Z) allows the user to edit the position information of the start and end points of each melt process. The position information are the X-, Y- and Z coordinates. For example, the coordinate information is (x12, y12, z12) for the start point and is (x11, y11, z11) for the end point of the first melt process to be performed on the substrate. The terms x12, y12, z12, etc. in FIG. 4 are generic placeholders for illustration only, and numerical values such as 101, 359, 49, etc. based on any unit of measurement (for example, millimeters or inches) may actually be entered in the position information edit field.

Angular direction edit field (corresponding to the column labeled θ) allows the user to enter or edit angle θ of the start and end points of each melt process. Angle θ can be the angle between the X-axis direction and the center axis of heating tool 9. For example, the angles are θ12 for the start point and θ11 for the end point of the first melt process to be performed on the substrate. The terms θ11, θ12, etc. in FIG. 4 are generic placeholders for illustration only, and numerical values such as 30, 99, etc. based on any unit of measurement (for example, degrees or radians) may actually be entered in the angular direction edit field.

The condition edit field (corresponding to the column labeled "condition") allows the user to edit the melt process conditions for each target position. Melt process conditions include timing for the melt process and the amount of solder to supply to distal end 91. When condition edit field is clicked, an edit screen is display to allow the user to edit various melt process conditions as described below.

As shown in FIG. 4, when the user selects "point soldering" in the class field, the user may then specify process conditions for "main process condition" and "after process condition" for the process end point. This is because, for point soldering, solder is deposited at the end point. Also, the user may specify process conditions for "pre-process condition" for the start point.

We now refer to Sequence 1 in FIG. 4. After the user selects "point soldering" for Sequence 1, the user can then click "main process condition" and "after process condition" in the condition edit field for the end point located at (x11, y11, z11).

When "main process condition field" is clicked by the user for point soldering end point (x11, y11, z11), an edit screen will be displayed to allow the user to edit values for process conditions for a main melt process (referred to herein as principal melt process). Process conditions can include a solder supply amount. In the edit screen, the user can edit values for a solder supply amount (referred to herein as a principal supply amount) for principal melt process. The user entries are used by controller 1 to set process conditions for the principal melt process.

Additional process conditions which the user can edit in the edit screen (when "main process condition field" is clicked by the user for the point soldering end point) can include: a first speed at which distal end 91 is moved in a first route from a current position to a start point; a second speed at which distal end 91 is moved in a second route from the start point to the end point; and a third speed at which distal end 91 is moved in a third route from the end point to a predetermined recede position.

When "after process condition" is clicked by the user for point soldering start point (x12, y12, z12), an edit screen will be displayed to allow the user to edit process conditions for a melt process (referred to as a finishing melt process) performed when distal end 91 is kept at the end point after completion of the principal melt process. These process conditions can include a solder supply amount. In the edit screen, the user may edit a solder supply amount for the finishing melt process (referred to herein as a finishing supply amount). Normally, the finishing supply amount would be less than the principal supply amount.

After the user selects "point soldering" for Sequence 1, the user can then click "pre-process condition" in the condition edit field for the start point (x12, y12, z12). When "pre-process condition" is clicked by the user for the point soldering start point, an edit screen will be displayed to allow the user to edit process conditions for a melt process (referred to herein as a preparatory melt process) performed before principal melt process. In the edit screen, the user may edit a solder supply amount for the preparatory melt process (referred to herein as a preparatory supply amount). Normally, the preparatory supply amount would be less than the principal supply amount.

Next, we now refer to Sequence 3 in FIG. 4. After the user selects "drag soldering" for Sequence 3, the user can then click "pre-process condition" and "main process condition" in the condition edit field for the start point located at (x31, y31, z31).

When "main process condition" is clicked by the user for drag soldering start point (x31, y31, z31), an edit screen will be displayed to allow the user to edit process conditions for a main melt process (referred to herein as a principal melt process) continuously performed while distal end 91 moves from the start point to the end point. These process conditions can include a solder supply amount, moving speed, and/or angular rotation speed. In the edit screen, the user may edit a solder supply amount for the principal melt process, moving speed of distal end 91, and rotating speed of heating tool 9. In addition, as with descriptions above when clicking "the main process condition" for point soldering, the user may edit first, second, and third speeds for first, second, and third routes, respectively. The first, second, and third routes are the same as what was described above when clicking "the main process condition" for point soldering.

When "pre-process condition" is clicked by the user for drag soldering start point (x31, y31, z31), an edit screen will be displayed to allow the user to edit process conditions for a melt process performed before the principal melt process (referred to herein as a preparatory melt process). In the edit screen, the user may edit a solder supply amount for the preparatory melt process (referred to herein as a preparatory supply amount). Normally, the preparatory supply amount would less than the total solder supply amount of the principal melt process.

After the user selects "drag soldering" for Sequence 3, the user can then click "after process condition" in the condition edit field for end point (x32, y32, z32). When "after process condition" is clicked by the user for the drag soldering end point, an edit screen will be displayed to allow the user to edit process conditions for a melt process (referred to herein as a finishing melt process) performed while distal end 91 is kept in the end point after the principal melt process. In the edit screen, the user may edit a solder supply amount for the finishing melt process (referred to herein as a finishing supply amount). Normally, the finishing supply amount would less than the total solder supply amount of the principal melt process.

In the recede mode select field (FIG. 4), the user may enter a selection that determines how distal end 91 will move after the melt process is completed at a target position. The user may select a "start point" recede mode, which will cause distal end 91 to move from the end point back to the start point of the melt process. The user may select an "upward" recede mode, which will cause distal end 91 to move away from the end point, in an upward direction along the Z-axis without any movement along the X-axis and Y-axis.

After an "upward" recede mode is selected, a further selection screen will appear. In this selection screen, the moving amount for moving distal end 91 upward along the Z-axis direction can be selected by the user as either default recede value z0 or customized recede value zi. Default recede value z0 is a preset value based on the height of components expected to be on the current substrate. Default recede value z0 can be relatively large if the substrate is mounted with tall components. Default recede value z0 can be relative small if the substrate is mounted only with short components, thereby shortening the amount of time spent moving to the next start point. Instead of z0, the user may specify customized recede value zi in the selection screen. The user enters a particular value (particular distance) for customized recede value zi which will cause distal end 91 to move above the end point. With either z0 or zi being selected in the selection screen, distal end 91 will move from the end point of the current melt process to a recede point. From the recede point, distal end 91 will move to the start point of the next melt process.

Button key B1 (also referred to as new key) is a key allows the user to specify an entirely new set information (referred to herein as melting control information) in edit operation screen W1. When key B1 is clicked, controller 1 controls display 5 to clear the information displayed in edit operation screen W1, thus allowing the user to enter a new set of melting control information.

Button key B2 (also referred to as open key) is a key for opening the melting control information stored in memory 7 (FIG. 1). When key B2 is clicked, controller 1 controls display 5 to display a list of the substrate information for selection, which is part of information included in the melting control information. When a particular substrate information is selected, controller 1 retrieves from memory 7 the melting control information associated with the selected substrate information. Controller 1 controls display 5 to show the retrieved melting control information on edit operation screen W1.

Button key B3 (also referred as save key) is a key for saving the melting control information edited at edit operation screen W1. When key B3 is clicked, controller 1 saves the melting control information present in edit operation screen W1 to memory 7.

Button key B4 (also referred to as run key) is a key for executing the control of the operation for moving distal end 91 while performing melt process according to the melting control information shown in edit operation screen W1. When key B4 is clicked, operation receiving module 15 receives the request for execution, which allows process selection module 13, receiving module 11, and recede selection module 14 to receive the user's previous input or selection of various information already present in edit operation screen W1.

Specifically, process selection module 13 receives the user's prior selection of either "point soldering mode" or "drag soldering" which is present in the process mode selection field.

When key B4 is clicked and when point soldering mode has been selected for a particular process (for example, the process in Sequence 1 in FIG. 4), receiving module 11 receives position information for the start point (for example, coordinates x12, y12, z12) as a second point, and receives position information for the end point (example, coordinates x11, y11, z11) as a first point.

When key B4 is clicked and when drag soldering mode has been selected for a particular process (for example, the process in Sequence 3 in FIG. 4), receiving module 11 receives the position information for the start point (for example, coordinates x31, y31, z31) as a first point, and receives the position information for the end point (for example, coordinates x32, y32, z32) as a second point. Usually, z31 is the same as z32 so that distal end 91 remains at the same elevation (i.e., the same Z coordinate) during drag soldering.

When key B4 is clicked, recede selection module 14 receives the user's prior selection of either "start point" or "upward" which is present in recede mode field. With "upward" recede mode, recede selection module 14 receives either default recede value z0 or customized recede value zi. As previously discussed, z0 and zi determine how far distal end 91 will move upward.

When key B4 is clicked, process control module 12 controls melt processes using the information received by process selection module 13, receiving module 11, recede selection module 14, together with other control conditions etc. edited at the condition edit fields. The operation of this control will be described later.

Button key B5 (also referred to as close key) is a key for closing edit operation screen W1. When the key B5 is clicked, controller 1 controls display 5 to close edit operation screen W1.

Button key B6 (also referred to as operation test key) is a key for performing trial operation. When any one of the sequences in edit operation screen W1 (for example, Sequence 1, 2, or 3 in FIG. 4) is selected and then button key B6 is clicked, operation receiving module 15 controls display 5 to show an edit operation screen W2 (FIG. 11).

As shown in FIG. 11, edit operation screen W2 includes four edit fields A21 to A24, three selection fields C21 to C23, and two graphic button keys B21 and B22. Edit fields A21 to A24 contain values V1, V2, V3, and R1. It is to be understood that V1, V2, V3, and R1 are generic placeholders for illustration only, and numerical values such as 2.5, 10, etc. may actually be entered in edit fields A21 to A24. Edit fields A21 to A24 are for the particular sequence (for example, Sequence 1, 2, or 3 in FIG. 4) which was selected by the user when operation test key B6 was clicked by the user. The selected sequence is referred to as the trial target sequence. The values in fields A21 to A24 can be different or the same for Sequence 1, 2, 3, etc. in FIG. 4.

As discussed above, when "main process condition field" was clicked by the user in edit operation screen W1 (FIG. 4), the user was able to specify a first speed at which distal end 91 is moved in a first route from a current position to a start point; a second speed at which distal end 91 is moved in a second route from the start point to the end point; and a third speed at which distal end 91 is moved in the third route from the end point to a predetermined recede position.

In edit operation screen W2 (FIG. 11), edit field A21 initially displays the first speed V1 that the user previously set for the main process condition of the trial target sequence. Edit operation screen W2 allows the user to edit the value for V1.

Edit field A22 initially displays the second speed V2 that the user previously set for the main process condition of the trial target sequence. Edit operation screen W2 allows the user to edit the value for V2.

Edit field A23 initially displays the third speed V3 that the user previously set for the main process condition of the trial target sequence. Edit operation screen W2 allows the user to edit the value for V3.

Edit field A24 shows adjustment rate R1 for reducing or increasing any of speed values V1, V2, and V3 (referred to as nominal speeds) to obtain adjusted speeds. For example, R1 less than 100% will reduce the speed values, and R1 greater than 100% will increase speed values. The adjusted speed value will be equal to nominal speed value (for example, V1, V2, or V3)×adjustment rate R1.

Selection fields C21 to C23 are boxes that specify whether the nominal speed value or the adjusted speed value will be used. The user may click the boxes to enter check marks into or remove check marks from the boxes. An empty box means that the nominal speed value will be used. A checked box means that the adjusted speed value will be used. For example, box C21 is empty, so the first speed will be set to nominal speed value V1.

Box C22 contains a check mark, so the second speed will be set to the adjusted speed value. The adjusted speed value is equal to V2×R1.

Box C23 contains a check mark, so the third speed will be set to the adjusted speed value. The adjusted speed value is equal to V3×R1.

To summarize, the user presses operation test key B6 in W1 (FIG. 4) while having selected a trial target sequence (for example, Sequence 1 or 3), which causes display 5 to show W2 (FIG. 11) for the trial target sequence. In W2, the user may adjust speed values for the first, second, and third routes of distal end 91, and then the user may click on button key B21 to actually start the trial operation.

Button key B21 is a button key for inputting an execution instruction of the trial operation. When button key B21 is clicked by the user, operation receiving module 15 receives an execution instruction, which allows process selection module 13, receiving module 11, and recede selection module 14 to accept the user's previous inputs or selections of various information in edit operation screens W1 and W2, as discussed below.

When key B21 is clicked by the user, process selection module 13 accepts the user's prior selection of either "point soldering" or drag soldering" in the process selection mode field (FIG. 4) of the trial target sequence. For "point soldering" (for example, the trial target sequence being Sequence 1 in FIG. 4), receiving module 11 receives the position information for the start point (for example, x12, y12, z12) as the second point, and the position information for the end point (for example, x11, y11, z11) as the first point. For "drag soldering" (for example, the trial target sequence being Sequence 3 in FIG. 4), receiving module 11 accepts the position information for the start point (for example, x31, y31, z31) as the first point, and the position information for the end point (for example, x31, y31, z31) as the second point.

When key B21 is clicked by the user, recede selection module 14 accepts the user's prior selection of either "start point" or "upward" in the recede mode selection field (FIG. 4) of the trial target sequence. For "upward" recede mode, recede selection module 14 receives either default recede value z0 or customized recede value zi. As previously discussed, z0 and zi determine how far distal end 91 will move upward without any movement in the X- and Y-axis directions.

Further, when operation receiving module 15 receives an execution instruction of trial operation (caused by clicking key B6 in edit operation screen W1 of FIG. 4), adjustment request receiving module 16 reduces or increases the movement speed of distal end 91 based on selection fields C21 to C23 in edit operation screen W2 of FIG. 11.

In the example of FIG. 11, adjustment request receiving module 16 reduces or increases second speed V2 and third speed V3, which are the moving speed of distal end 91 in the second route and the third route. The second route and the third route are received as adjustment target routes for reducing or increasing the moving speed of the distal end 91.

Referring again to FIG. 11, button key B22 is a button key for closing edit operation screen W2. When the button key B22 is clicked, operation receiving module 15 controls display 5 to hide edit operation screen W2.

(Example Operation Flow for Point Soldering)

Figure 5:
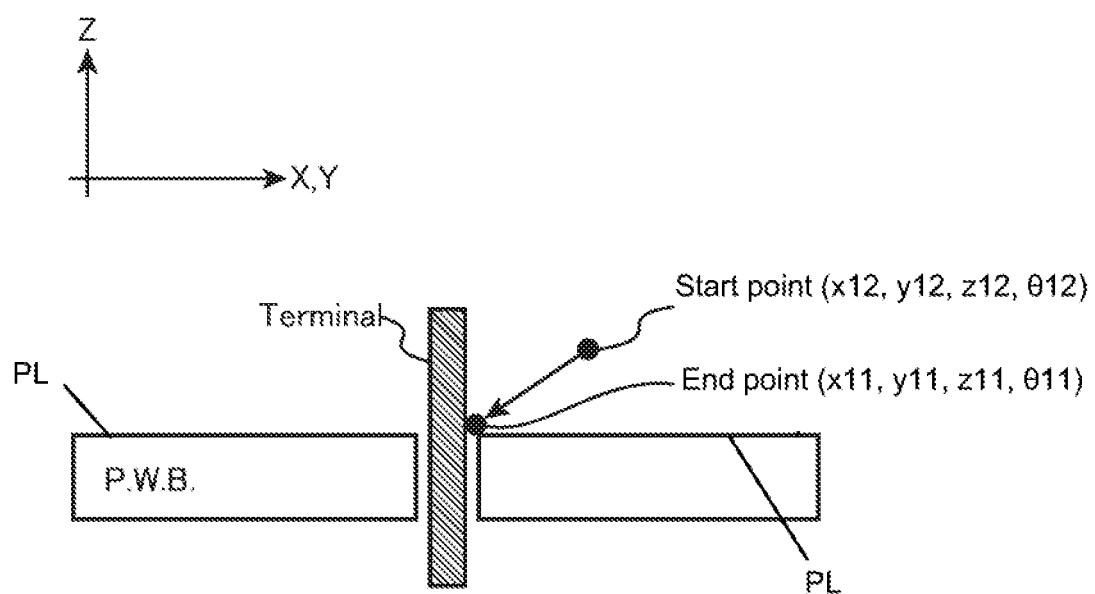
FIG. 5 is a diagram showing an example relationship between a start point (second point) and end point (first point) when a point solder mode is selected.
Figure 6:
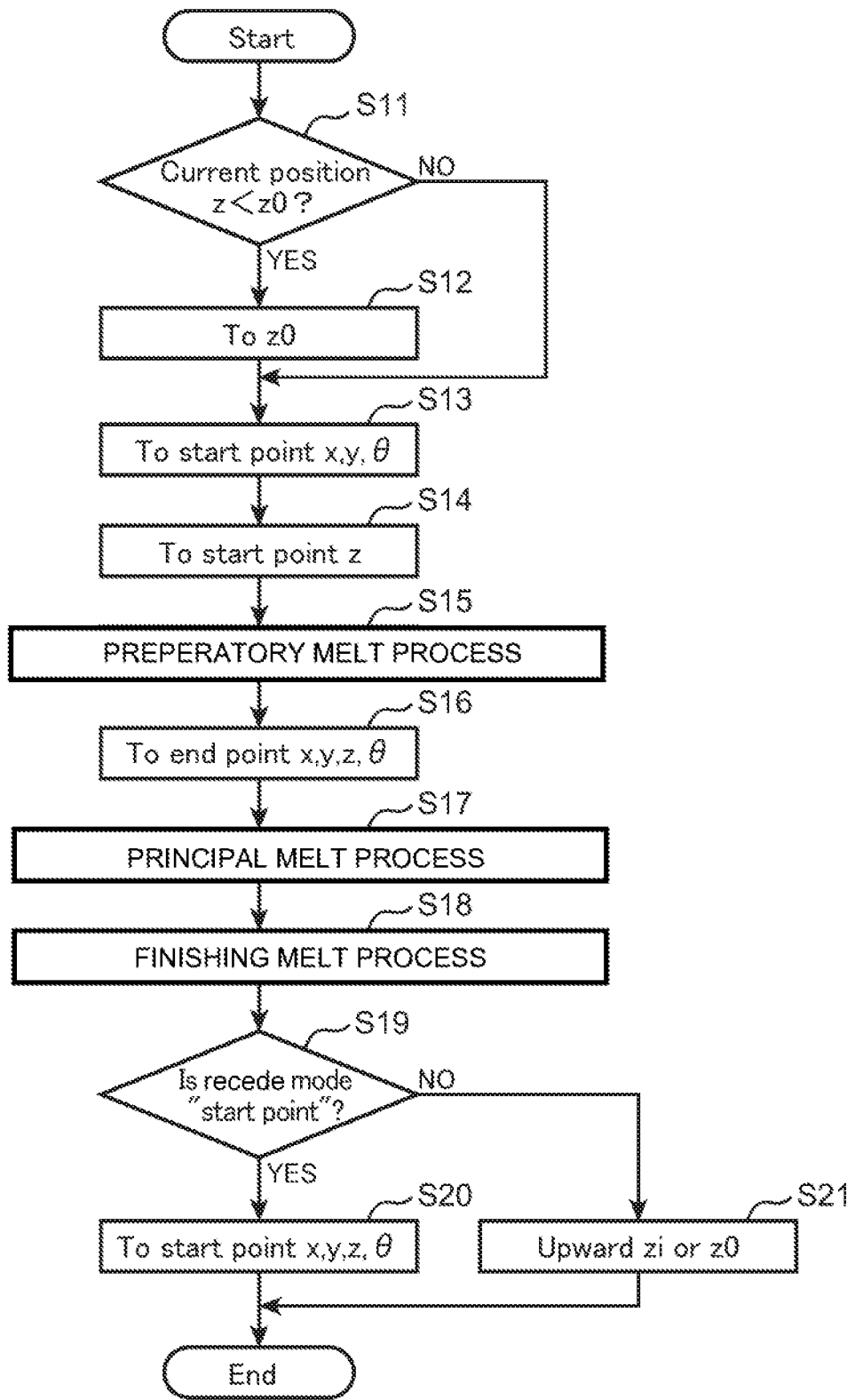
FIG. 6 is a flowchart showing an example point soldering process.

Here, the operation when forming a point solder at target position on the substrate will be described with reference to FIG. 5 and FIG. 6. The target position is where solder is to be deposited. FIG. 5 shows an example of the relationship between the start and end points for point soldering. FIG. 6 is a flow chart showing an example of non-trail operation for point soldering, such as when run key B4 is pressed.

FIG. 5 illustrates the target position of point soldering to be performed as Sequence 1 in FIG. 4. Position information and angular directions of the start point (x12, y12, z12, θ12) and the end point (x11, y11, z11, θ11) are indicated.

Prior to the operation indicated in FIG. 6, process control module 12 has controlled heater 2 to heat distal end 91 to a temperature able to melt solder. When run key B4 (FIG. 4) is clicked, operation receiving module 15 receives an execution instruction for Sequence 1 of FIG. 4. As a result, process selection module 13 receives the user's prior selection of "point soldering" for Sequence 1, and receiving module 11 receives the position information for the start point (referred to as the preparatory point) and for the end point (referred to as the principal point).

As shown in FIG. 6, in step S11, process control module 12 determines whether the Z coordinate of the current position (referred to as z) of distal end 91 is less than default recede value z0.

If process control module 12 determines that current position z is less than z0, meaning that distal end 91 is below z0 (step S11: YES), it will control third mechanical actuator 43 to move distal end 91 in the Z-axis direction from current position z to z0 (step S12), and the process proceeds to step S13.

If process control module 12 determines that current position z is the same as or greater than z0, meaning that distal end 91 is at or above z0 (step S11: NO), the process skips step S12 and proceeds to step S13.

In step S13, process control module 12 controls first mechanical actuator 41 and second mechanical actuator 42 to move distal end 91 to the X and Y coordinates of the start point (x12, y12) without moving in the Z-axis direction. Also, process control module 12 controls fourth mechanical actuator 44 to orient heating tool 9 to angular direction θ12 of the start point.

Next in step S14, process control module 12 controls third mechanical actuator 43 to move distal end 91 in the Z-axis direction to the position of the Z coordinate of the start point (z12). Thus, distal end 91 reaches the start point (x12, y12, z12, θ12), which is also referred to as a preparatory point.

Next in step S15, process control module 12 controls melt processing assembly 3 to perform a melt process (referred to as a preparatory melt process). Process control module 12 controls melt processing assembly 3 to supply an amount of solder (referred to as a preparatory supply amount) to distal end 91 according to the control condition edited in the "pre-process condition" field (FIG. 4). As shown in FIG. 5, the start point is raised above the substrate, and distal end 91 is not in contact with either the substrate or terminal. Applying solder to distal end 91 before making contact with either the substrate or terminal can improve soldering results. However, if there is no setting present in the "pre-process condition" field for a preparatory melt process, process control module 12 will not have melt processing assembly 3 perform a preparatory melt process, and step S15 is skipped.

Next in step S16, process control module 12 controls drive mechanism 4 to move distal end 91 to the end point, which is also referred to as a principal point. Specifically, process control module 12 controls first mechanical actuator 41, second mechanical actuator 42, and third mechanical actuator 43 to move distal end 91 to end point (x11, y11, z11), and also controls fourth mechanical actuator 44 to orient the heating tool 9 to angular direction θ11 of the end point.

Next in step S17, process control module 12 controls melt processing assembly 3 to perform a melt process (also referred to as a principal melt process). Process control module 12 controls melt processing assembly 3 to supply an amount of solder (referred to as a principal supply amount) to distal end 91. Thus, soldering is performed with principal supply amount of solder provided to distal end 91 at the target position. A solder joint point is formed at the end point (also referred to as the principal point). By selecting the point solder mode, it is possible to enter the end point which is the target position where a solder point is formed on the substrate.

If the melt process in step S15 (preparatory melt process) is performed, with the preparatory supply amount of solder applied to distal end 91 at the start point, it then becomes possible for distal end 91 to subsequently touch the end point with some solder already present on distal end 91 before starting the melt process in step S17 (principal melt process). As additional solder is supplied to distal end 91 while at the end point (target position), the additional solder is more likely to properly blend onto the target position. In this way, soldering accuracy at the target position can be improved.

Next at step S18, after completion of the melt process in step S17, process control module 12 controls melt processing assembly 3 to keep distal end 91 at the end point and begins another melt process (also referred to as a finishing melt process). Process control module 12 controls melt processing assembly 3 to supply an amount of solder (referred to as a finishing supply amount) to distal end 91 according to settings in the "after process condition" field (FIG. 4). This way, it is possible to apply more solder to the end point to enhance the soldering result. For example, adding more solder at this stage can result in a smooth gloss appearance. However, if there is no setting present in the "after process condition" field for a finishing melt process, process control module 12 will not have melt processing assembly 3 perform a finishing melt process, and step S18 is skipped.

Next at step S19, if recede selection module 14 receives the user's prior selection of "start point" recede mode (step S19: YES), the process proceeds to step S20 where process control module 12 controls drive mechanism 4 to move distal end 91 back from the end point to the to the start point. In step S20, process control module 12 controls first mechanical actuator 41, second mechanical actuator 42, third mechanical actuator 43, and fourth mechanical actuator 44 to move distal end 91 to the start point coordinates (x12, y12, z12) and to orient heating tool 9 to angular direction θ12 of the start point. The operation for forming a solder point at the target position of Sequence 1 (FIG. 4) is hereby completed.

With the start point recede mode, distal end 91 of heating tool 9 is returned to the position it occupied (the start point) before the principal melt process. This can reduce to risk that distal end 91 might later collide with an obstacle.

If recede selection module 14 received the user's selection of upward recede mode (step S19: NO), the process proceeds to step S21 where process control module 12 controls third mechanical actuator 43 to move distal end 91 upward according to the user's prior selection of default recede value z0 or customized recede value zi. The operation for forming a solder point at the target position of Sequence 1 (FIG. 4) is hereby completed.

By selecting the upward recede mode, after completion of principal melt process, distal end 91 of heating tool 9 can be moved upward without any movement in the X- and Y-axis directions. This way, the molten solder can be pulled upward by distal end 91 and thereby reduce the occurrence of copper exposure of the upper side of the soldering target component.

When recede selection module 14 receives selection of the start point recede mode (step S19: YES) with the X and Y coordinates of the start point and end point being identical and the Z coordinate of start point higher in position than the end point Z coordinate, distal end 91 will move upward in step S20 without any movement in X- and Y-axis directions, similar to step S21.

For both start point recede mode and upward recede mode, distal end 91 of heating tool 9 is moved away from the end point. Accordingly, the principal supply amount of solder melted in principal melt process can cool down, fixing the solder to the end point.

(Example Operation Flow for Drag Soldering)

Figure 7:
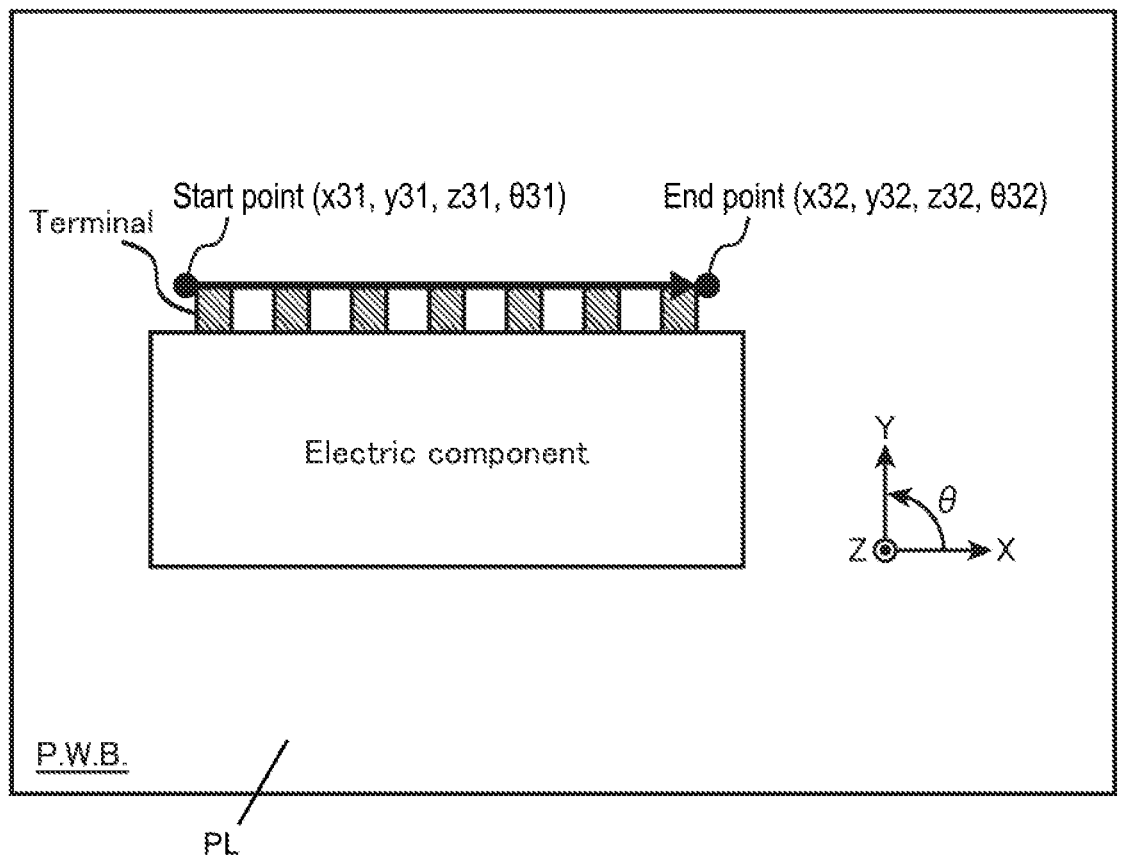
FIG. 7 is a diagram showing an example relationship between a start point (first point) and end point (second point) when drag solder mode is selected.
Figure 8:
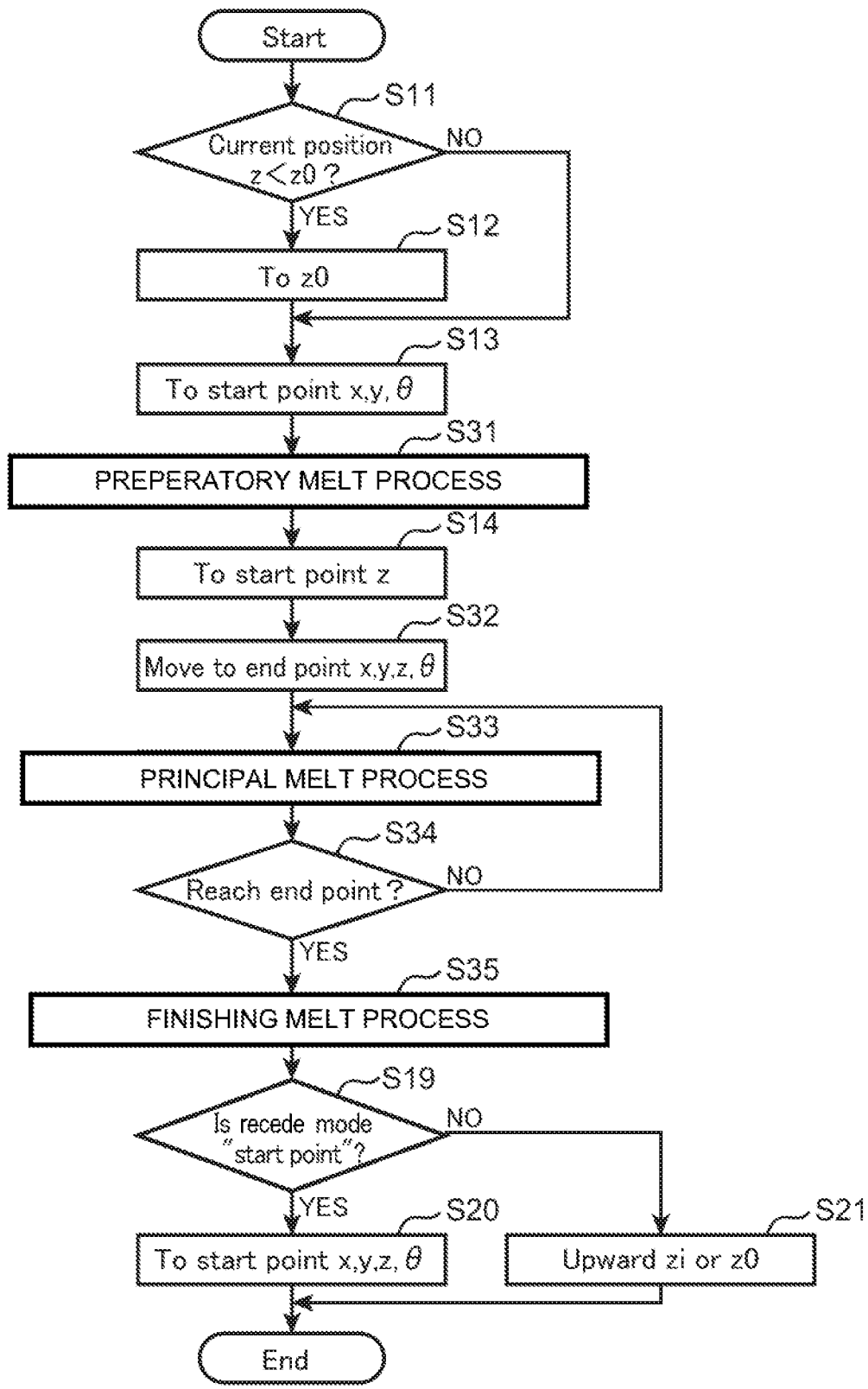
FIG. 8 is a flowchart showing an example drag soldering process.

Next, the operation drawing a line segment of solder to the target position on the substrate will be described with reference to FIG. 7 and FIG. 8. FIG. 7 shows an example of the relationship between the start and end points of drag soldering. FIG. 8 is a flow chart showing an example of non-trail operation for drag soldering, such as when run key B4 is pressed.

FIG. 7 illustrates the target position of drag soldering to be performed as Sequence 3 in FIG. 4. Position information and angular directions of the start point (x31, y31, z31, θ31) and the end point (x32, y32, z32, θ32) are indicated. Values for z31 and z32 could be the same, so that distal end 91 remains at the same elevation (Z-axis position) during drag soldering. Also, θ31 and θ32 could also be the same.

Prior to the operation indicated in FIG. 8, process control module 12 has controlled heater 2 to heat distal end 91 to a temperature able to melt solder. Thereafter run key B4 (FIG. 4) is clicked, which allows operation receiving module 15 to receive an execution instruction for Sequence 3 of FIG. 3. In this discussion, it is assumed that Sequences 1 and 2 of FIG. 4 have already been performed. As a result, process selection module 13 receives the user's prior selection of "drag soldering" mode for Sequence 3, and receiving module 11 receives the position information for the start point (referred to as the first point) and the end point (referred to as the second point).

In FIG. 8, steps S11 and S13 are performed in the same way as described in FIG. 6 except position information for Sequence 3 is used instead of that for Sequence 1. Upon completion of step S13, distal end 91 is at the X and Y coordinate (x31, y31) of the start point, but is not yet at the Z coordinate of the start point. That is, distal end 91 is at a raised position above the start point.

Next at Step S31, process control module 12 controls melt processing assembly 3 similar to step S15 (FIG. 6), and performs a preparatory melt process supplying the preparatory supply amount of solder according to the control condition previously edited by the user in the pre-process condition field (FIG. 4). The preparatory melt process is performed while distal end 91 is at the raised position above the start point. However, if there are no settings to perform the preparatory melt process in the pre-process condition field (FIG. 4), process control module 12 will not have melt processing assembly 3 perform a preparatory melt process, and step S31 will be skipped.

Next in step S14, process control module 12 controls third mechanical actuator 43 to move distal end 91 in the Z-axis direction to the Z coordinate (z31) of the start point. This moves distal end 91 from the raised position to the start point (x31, y31, z31, θ31), which is also referred to as the first point.

Next, in steps S32, S33, and S34, process control module 12 controls drive mechanism 4 and move distal end 91 from the start point to the end point (also referred to as the second point) while continuously performing a principal melt process.

In step S32, process control module 12 controls drive mechanism 4 to start move distal end 91 from the start point to the end point. Process control module 12 controls drive mechanism 4 so that while distal end 91 is moving from the start point to the end point, distal end 91 will move according to the moving speed specified in the "main process condition" field of edit operation screen W1 (FIG. 4). Also process control module 12 controls fourth mechanical actuator 44 to orient heating tool 9 to angular direction θ32 of the end point. Process control module 12 controls fourth mechanical actuator 44 so that while moving the direction of heating tool 9, the center axis heating tool 9 according to the rotation speed specified in the "main process condition" field of W1 (FIG. 4).

Specifically, as shown in FIG. 7, process control module 12 controls first mechanical actuator 41, second mechanical actuator 42, and third mechanical actuator 43 to move distal end 91 from the start point (x31, y31, z31) to the end point (x32, y32, z32) according to the speed specified at the main process condition field (FIG. 4), and controls fourth mechanical actuator 44 to orient heating tool 9 to angular direction θ32 of the end point. As previously mentioned, z31 is usually the same as z32 so that distal end 91 remains at the same elevation (i.e., the same Z coordinate) during drag soldering. While moving to the end point, process control module 12 controls fourth mechanical actuator 44 so the center axis of heating tool 9 will rotate according to the rotating speed specified in the "main process condition" field of W1 (FIG. 4).

In the example of FIG. 7, z31 is the same as z32, and θ31 is the same as θ31, Thus, process control module 12 will not control third mechanical actuator 43 and fourth mechanical actuator 44 to change the Z coordinate of distal end 91 and angular direction of heating tool 9. Process control module 12 will only control first mechanical actuator 41 and second mechanical actuator 42 to move distal end 91 in a straight line from the starting point X and Y coordinates (x31, y31) to the end point X and Y coordinates (x32, y32).

In step S33 of FIG. 8, process control module 12 controls melt processing assembly 3 to perform a principal melt process by supplying solder to the distal end according to a principal supply amount specified in the "main process condition" field of W1 (FIG. 4). The principal supply amount can be an amount per unit distance traveled by distal end 91. At step S34, the process checks whether distal end 91 has reached the end point. The principal melt process (step S33) does not end until distal end 91 reaches the end point (step S34: YES).

Thus, while distal end 91 is in a straight line from the start point to the end point, solder is continuously supplied according to the principal supply amount specified for the principal melt process. As a result, a certain amount of solder can be applied on a line with the start point and the end point as both ends. That is, a segment of solder can be drawn from the start point (which receiving module 11 received as coordinate information indicated as the first point) to an end point (which receiving module 11 received as the second point). So by selection of the drag solder mode, the start point and end point of the line segment drawn can be entered.

If the preparatory melt process was performed in step S31, with the preparatory amount of solder applied to distal end 91 while at the raised position above the start point, it then becomes possible for distal end 91 to subsequently touch the start point with some solder already present on distal end 91 before starting the melt process in step S33 (principal melt process). As additional solder is supplied to distal end 91 while at the start point (target position), the additional solder is more likely to properly blend onto the target position. In this way, soldering accuracy at the target position can be improved.

When distal end 91 reaches the end point (S34: YES), process control module 12 controls melt processing assembly 3 to ends the principal melt process. Next at step S35, while distal end 91 is still at the end point, process control model 12 controls melt processing assembly 3 to perform a finishing melt process to supply solder to distal end 91 according to a finishing supply amount specified in the "after process condition" field of W1 (FIG. 4). This way, it is possible to apply more solder to the end point to enhance the soldering result. For example, adding more solder at this stage can result in a smooth gloss appearance. However, if there is no setting present in the "after process condition" field for a finishing melt process, process control module 12 will not have melt processing assembly 3 perform a finishing melt process, and step S35 is skipped.

Next, recede mode steps S19, S20, and S21 of FIG. 8 are performed for Sequence 3 in the same manner as described for Sequence 1 in FIG. 6. The operation for forming a drag solder line segment at the target position (i.e., at the line from the start point to the end point) of Sequence 3 (FIG. 4) is hereby completed.

It will be appreciated from the above descriptions that by entering the coordinate information indicated as the first point of desired target position of the melt process (i.e., end point when point solder mode is selected, and start point when drag solder mode is selected), it is possible to perform melt process at the first point received by receiving module 11. Further, without changing the first point, the coordinate information indicated as the second points (i.e., start point when point solder mode is selected, and end point when drag solder mode is selected) can be entered so distal end 91 of heating tool 9 can trace the appropriate moving track.

Further, it will be appreciated from the above descriptions that distal end 91 can reach the target position with high accuracy, since the center axis of heating tool 9 can be kept at an inclined attitude relative to substrate surface PL while heating tool 9 is moved by arm 8 in the X-, Y-, and Z-axis directions. The inclined attitude is between 0 to 90 degrees from substrate surface PL. The target position for depositing solder can be between substrate surface PL and the bottom of a component. By entering the target position as the coordinate information indicated as the first point, and specifying the second point as a position spaced away from the target position with an inclined attitude relative to substrate surface PL, it is possible to move distal end 91 from the second point to the first point (target position) with an inclined attitude that allows distal end 91 to reach the target position without hitting the top surface of the component.

Further, unlike the conventional systems, the coordinate information indicated as the first point as target position of the melt process can be set directly, and adjustment of each of the numerous set points to decide the target position of melt process is not required. Therefore, even if the position of the target position of melt process is changed because the support jig supporting the substrate is moved after setting the target position of the melt process, the target position can be quickly and easily amended and set to the moved target position. According to the configuration of the present embodiment, the operator can set coordinate information of melt process directly after changing the target position, thus the complexity of setting operation of the target position of the melt process can be solved.

In addition as described above, since the first point is the position where the melt process is performed, drive mechanism 4 stops distal end 91 of heating tool 9 at the first point under control of process control module 12. Therefore, distal end 91 of heating tool 9 is unlikely to have large impact force. This reduce the risk of damaging distal end 91 of heating tool 9.

Further, according to the configuration of the present embodiment, by selecting the point solder mode, the solder point formed at the position on the substrate can be formed, by entering the coordinate information indicated as the first point as the end point when moving distal end 91 to form a solder point at the position, and entering the coordinate information of second point as the start point before moving distal end 91 to form the solder point at the first point. By selecting the drag solder mode, the coordinate information of first point is entered which is the start point of the trace drawn on the substrate, and the coordinate information of second point is entered which is the end point of the trace.

According to the configuration of the present embodiment, the selection of forming solder points on the substrate and drawing a line segment on the substrate is possible. Further, when either one is selected, the information required is common to the start point and the end point, when distal end 91 is moved to either form a solder point or a line segment drawn.

(Example Operation Flow for Trial Operation)

Figure 12:
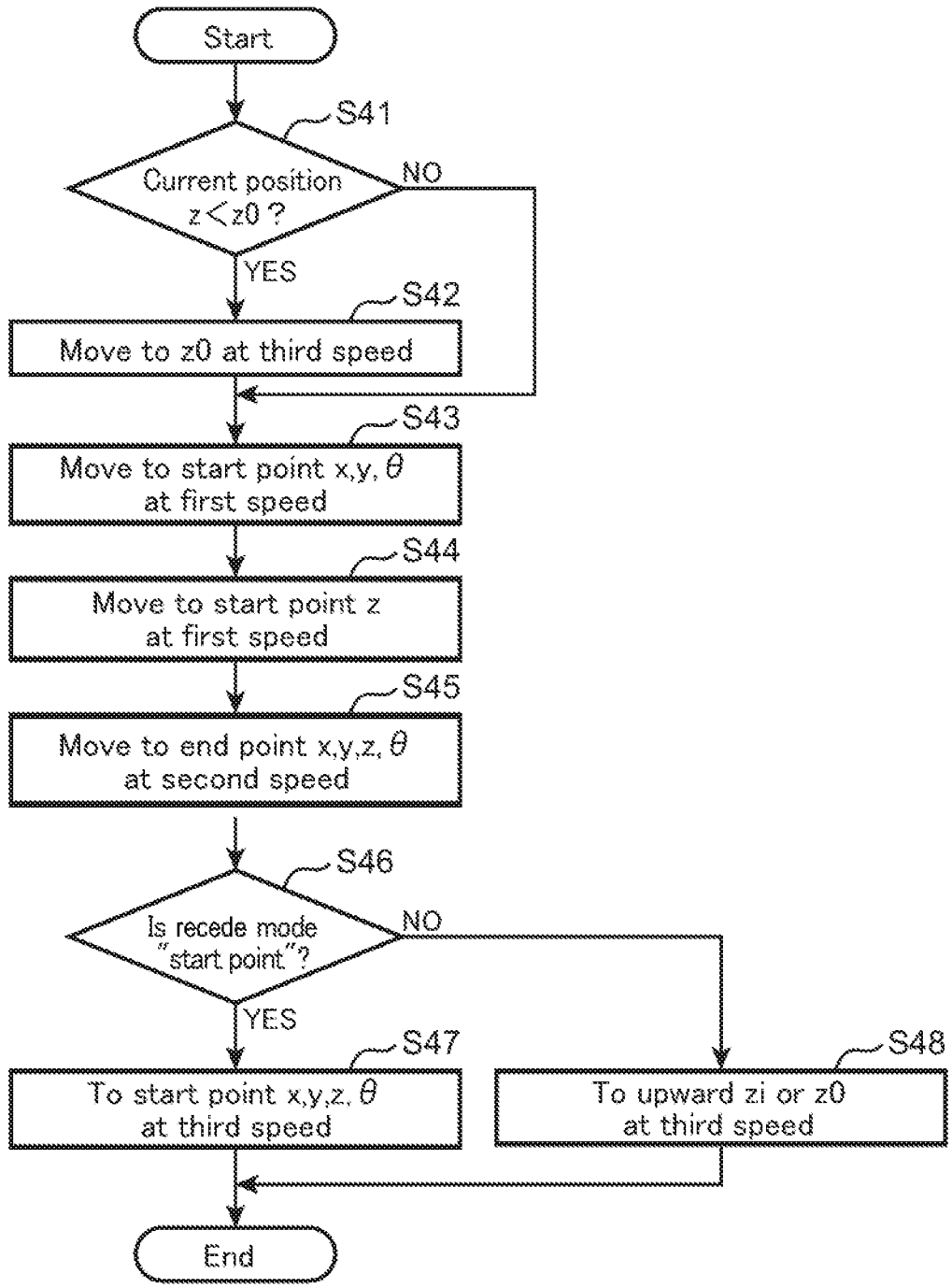
FIG. 12 is a flowchart showing an example trial operation.

Next, the trial operation will be described with reference to FIG. 12. FIG. 12 is a flowchart showing an example of the trial operation. As a specific example, the description below is for a trial operation executed for Sequence 1 of operation edit screen W1 (FIG. 4). That is, Sequence 1 (a point soldering process) is the trial target sequence.

In edit operation screen W1 (FIG. 4), the user clicks button key B6 while Sequence 1 is selected, which causes edit operation screen W2 (FIG. 11) to be displayed with nominal speeds V1 to V3 and boxes C21 to C23 for adjusting the speeds. The user clicks key B21 in W2. As a result, operation receiving module 15 receives the execution instruction of trial operation, and adjustment request receiving module 16 uses the information in W2 to determine adjusted speeds, if appropriate, and trial control module 17 starts the trial operation.

As shown in FIG. 12, the trial operation starts at step S41 where control module 17 moves distal end 91 upward based on whether the current Z coordinate of distal end 91 is less than default recede value z0.

When trial control module 17 determines that the current Z coordinate is less than z0, which means that distal end 91 is located below z0 (step S41: YES), the process proceeds to step S42 where trial control module 17 controls third mechanical actuator 43 to move distal end 91 from the current Z coordinate to z0 without any movement in the X- and Y-axis directions. Movement to z0 is performed according to the third speed specified in W2 (FIG. 12). Note that steps S41 and S42 in FIG. 12 are performed by trial control module 17 in the same way as steps S12 and S13 in FIG. 6 are performed by process control module 12.

Specifically, when adjustment request receiving module 16 does not accept the third route (i.e., the route toward a recede position) as an adjustment target route (i.e., when box C23 in W2 is empty), trial control module 17 uses nominal speed V3 as the third speed. On the other hand, when adjustment request receiving module 16 accepts the third route as an adjustment target route (i.e., when box C23 in W1 contains a check mark), trial control module 17 uses the adjusted speed, which equals nominal speed V3×adjustment rate R1, as the third speed.

Next in step S43, trial control module 17 controls first mechanical actuator 41 and second mechanical actuator 42 to move distal end 91 to X and Y coordinates of the start point (x12, y12) shown in FIG. 5 without moving in the Z-axis direction. Distal end 91 does not go to the Z coordinate of the start point. However, movement is partially toward the start point, so movement is performed according to the first speed specified in W2 (FIG. 12). Also, trial control module 17 controls fourth mechanical actuator 44 to orient the center axis of heating tool 9 to angular direction θ12 of the start point. Note that x12, y12, and θ12 are used since Sequence 1 (FIG. 4) is the trial target sequence in this example. Also, note that step S43 in FIG. 12 is performed in the same way as steps S12 and S13 in FIG. 6.

Specifically, when adjustment request receiving module 16 does not accept the first route (i.e., a route toward the start point) as an adjustment target route (i.e., when box C21 in W2 is empty), trial control module 17 moves distal end 91 at the first speed which is equal to nominal first speed V1 in W2. On the other hand, when adjustment request receiving module 16 accepts the first route as an adjustment target route (i.e., when box C21 in W2 contains a check mark), trial control module 17 moves distal end 91 at the first speed which is equal nominal speed V1×the adjustment rate R1.

Next in step S44, trial control module 17 controls third mechanical actuator 43 to move distal end 91 to the Z coordinate of the start point (z12) without moving in the X- and Y-axis directions. Movement is performed according to the first speed specified in W2 (FIG. 12). This brings distal end 91 to the start point (x12, y12, z12). Note that movement in both steps S43 and S44 are performed according to the first speed. Also, note that step S44 in FIG. 12 is performed in the same way as step S14 in FIG. 6.

Next in step S45, trial control module 17 controls first mechanical actuator 41, second mechanical actuator 42, and third mechanical actuator 43 to move distal end 91 to the end point (x11, y11, z11) of the target trial sequence. Since movement is toward the end point, movement is performed according to second speed specified in edit operation screen W2 for the target trial sequence. Also, trial control module 17 controls fourth mechanical actuator 44 to orient the center axis of heating tool 9 to angular direction ell of the end point.

Specifically, when adjustment request receiving module 16 does not accept the second route (i.e., a route toward the end point) as an adjustment target route (i.e., when box C22 is empty), trial control module 17 moves the soldering tip at the second speed, which is equal to nominal speed V2. On the other hand, when adjustment request receiving module 16 accepts the second route as an adjustment target route (i.e., when box C22 contains a check mark), trial control module 17 moves the soldering tip in S45 at the second speed that is equal to nominal speed V2×adjustment rate R1. Note that step S45 in FIG. 12 is performed in the same way as step S16 in FIG. 6.

Next in step 46, the process determines the recede mode that was previously selected by the user. Recede selection module 14 may have received the selection of "start point" recede mode (step S46: YES), in which case the process proceeds to step S47. In Step S47, as at S20 in FIG. 6, trial control module 17 controls first mechanical actuator 41, second mechanical actuator 42, third mechanical actuator 43, and fourth mechanical actuator 44 to move distal end 91 to the start position (x12, y12, z12, θ12). Since movement is toward a recede position, movement is performed according to the third speed.

On the other hand, recede selection module 14 may have received the user's selection of "upward" recede mode (step S46: NO), in which case the process proceeds to step S48. In step S48, as in S21 in FIG. 6, trial control module 17 controls third mechanical actuator 43 to move distal end 91 in the Z-axis direction without moving in the X- and Y-axis directions. Movement is performed according to either default recede value z0 or customized recede value zi, and is also performed according to the third speed as was used in step S42.

According to the configuration of the present embodiment, by not selecting the adjustment target route for reducing the moving speed of distal end 91, by inputting an execution instruction of trial operation, distal end 91 can be moved without performing the melt process. This makes it possible to confirm whether a collision of distal end 91 with parts on the board would when distal end 91 is moved without performing the main (melt process) operation. Note that in FIG. 12, preparatory, principal, and finishing melt processes were not performed, unlike in FIG. 6.

When a collision arises, the user can edit adjustment rate R1 in edit operation screen W2 to less than 100% to reduce movement speed, use boxes C21 to C23 to select the route where the problem occurred as the adjustment target route for reducing the movement speed, and execute trial operation. During the trial operation, distal end 91 is moved without performing any melt process and is moved at a reduced speed. This can help the user better understand the problem occurring in the adjustment target route. When the user believes the problem has been solved, the user can edit adjustment rate R1 to greater than 100%, use boxes C21 to C23 to select the route where the problem occurred previously, and another execute trial operation. With increased speed, it is possible to promptly confirm that the problem has been solved.

(Modifications)

The above descriptions are only non-limiting example embodiments, and one skilled in the art may appreciate from reading the descriptions that modifications can be made. Some modifications are described below as non-limiting examples.

(Modification 1)

In edit operation screen W1 shown in FIG. 4, controller 1 interprets values for the X, Y, and Z coordinates for the start point relative to a predetermined origin (0, 0, 0), which can be located on substrate surface PL as shown in FIG. 3. Alternatively, the user may specify in operation edit screen W1 offset values (for example, xa, ya, and za) for the X, Y, and Z coordinates relative to the end point. Then, the controller 1 uses offset values to determine the location of the start point. This alternative can lessen the time needed for the user to edit the three-dimensional coordinate for the start point.

Specifically, in edit operation screen W1 (FIG. 4), when "point solder" is selected in the process mode selection field, the position information edit fields for X, Y, and Z coordinates for the start point cannot be edited. W1 includes fields to enter offset values xa, ya, and za. The offset values define distance from the end point and direction (positive or negative) of the distance.

For example, as the field to enter distance and directional information, only one editing field is provided in W1 for an offset value. There is an editing field for each of the orthogonal X-, Y-, and Z-axis directions. Each editing field allows user entry of both a distance and direction.

In this case, with reference to FIG. 4, the coordinates for X (for example, x11 and x21), Y (for example, y11 and y21) and Z for end points of point soldering are entered in W1. Controller 1 calculates the start point using offset values. For example, coordinates for the start point may be calculated as (x11+xa, y11+ya, z11+za) for Sequence 1 and (x21+xa, y21+ya, z21+za) for Sequence 2. Alternatively coordinates for the start point may be calculated as (x11−xa, y11−ya, z11−za) for Sequence 1 and (x21−xa, y21−ya, z21−za) for Sequence 2.

Note that the editing field for offset values for xa, ya, and za can be provided at each of the position information edit fields in W1.

Figure 9:
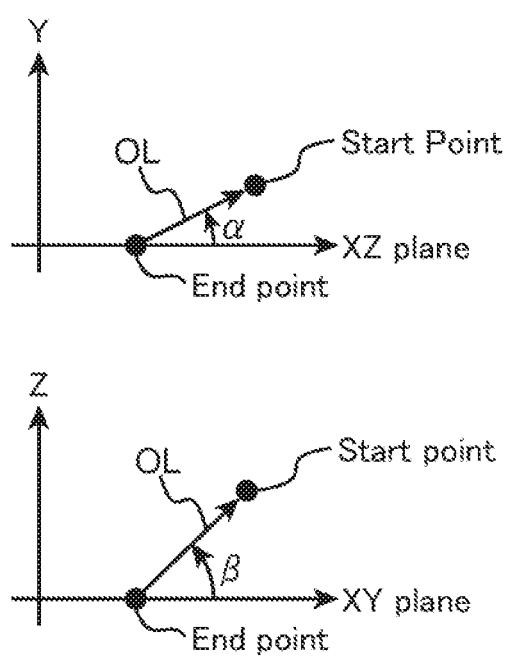
FIG. 9 is a diagram showing how three-dimensional spherical coordinates ($\alpha, \beta, OL$) may be used to specify movement from an end point toward a start point.

Further as an alternative, the start point may be defined relative to the end point in terms of spherical coordinates comprising two angles $\alpha$ and $\beta$ and vector distance OL. The editing field in W1 for offset values xa, ya, and za can be replaced with an editing field $\alpha$, $\beta$, OL. FIG. 9 shows an explanatory view of direction from the end point to the start point. As shown in FIG. 9, the direction going from the end point to the start point can be identified by angle $\alpha$ (alpha) formed by the line OL with respect to the XZ plane and angle $\beta$ (beta) formed by the line OL with respect to the XY plane, the line having the same length as the distance indicated by the distance information, with the end and start point as the end-to-end.

According to this configuration, the user enters into W1 the X, Y, and Z coordinates of the end point, vector distance OL from the end point to the start point, and the distance information indicated as the distance from the end point and the direction information indicated as the direction from the end point is entered. By the position of the end point, distance information, and the direction information, distal end 91 of heating tool 9 can be moved from the start point to the end point defined in the three dimensional coordinates.

Note that angle $\alpha$ (alpha) can be the angle formed by the center axis of heating tool 9, so angle $\alpha$ corresponds to angular direction $\theta$ previously discussed. This way, the time for editing of angle $\alpha$ (alpha) could further be shortened. Furthermore, angle $\beta$ (beta) formed may be the angle between the center axis of heating tool 9 and the XY plane, which can further shorten to edit angle $\beta$ (beta). That is, by making angle $\alpha$ as an angle formed by the center axis of heating tool 9 in angular direction $\theta$ (FIG. 3) with respect to the X axis direction at the end point, and by making angle $\beta$ (beta) formed by the center axis of heating tool 9 and the XY plane, it is possible to newly provide only the field for the distance information.

(Modification 2)

Heating tool 9 can be held by arm 8 of a four-axis drive robot (FIG. 3) in an orientation perpendicular to substrate surface PL. By this configuration, unlike conventional systems, without the use of an air cylinder, the three-dimensional coordinates for the target position of the melt process can be entered as the first point, the three-dimensional coordinates for a second point positioned away from the target position in an inclined attitude with respect to substrate surface PL can be entered, and distal end 91 moves between the position away and the target position by means of arm 8 which moves in the X, Y, and Z-axis directions.

(Modification 3)

As previously discussed, when operation receiving module 15 receives the execution instruction of the main operation (i.e., when run key B4 in W1 is clicked), process control module 12 may execute the main operation by using the information, targeted route and control conditions and the like edited in the condition edit column of W1 received by process selection module 13, receiving module 11, recede selection module 14, and adjustment request receiving module 16. Edit operation screen W2 (FIG. 11) is not displayed.

The above can be modified as follows. When run key B4 is clicked, operation receiving module 15 receives the execution instruction of the main operation and controls display 5 to display the moving speed edit operation screen W2 (FIG. 11). Then, the sequence display field in which the sequence "1" is displayed in edit field A2 of edit operation screen W1 is set as the trial target sequence display field, and operation receiving module 15 displays the sequence display field in the edit fields A21 to A23 of the displayed edit operation screen W2, A process of displaying set values of the first speed, the second speed, and the third speed edited in the processing condition column corresponding to the trial target sequence display field (hereinafter referred to as setting value display processing) may be performed.

Then, when button key B21 is clicked after editing in the editing columns A21 to A24 and selecting in the selection columns C21 to C23, process selection module 13, receiving module 11 and recede selection module 14 accept input or selection of various information corresponding to the trial target sequence display field. Further, adjustment request receiving module 16 selects the adjustment target route for reducing or increasing the movement speed of distal end 91 based on the selection result at each of the three selection fields C21 to C23 on the displayed edit operation screen W2. Process control module 12 performs the operation shown in FIG. 6 when the point soldering mode is selected in the processing mode selection field corresponding to the trial target sequence display field, and drag soldering mode is selected in the processing mode selection field corresponding to the trial target sequence display field.

When performing the operations shown in FIGS. 6 and 8, process control module 12 moves distal end 91 at the third speed in the same manner as in S42 (FIG. 12) in S12. In S13, in S43 (FIG. 12) distal end 91 is moved at the first speed, and in S14, distal end 91 is moved at the first speed in the same manner as in S44 (FIG. 12). When process control module 12 performs the operation shown in FIG. 6, in S16, distal end 91 is moved at the second speed like the S45 (FIG. 12), and in the case where the operation shown in FIG. 8 is performed, In S32, distal end 91 may be moved at the second speed as in S45 (FIG. 12). In addition, when process control module 12 performs the operations shown in FIGS. 6 and 8, in S20, distal end 91 is moved at the third speed as in S47 (FIG. 12), and in S21 as S48 (FIG. 12), distal end 91 is moved at the third speed.

When process control module 12 completes the operations shown in FIGS. 6 and 8, the next sequence display field would be the new targeted sequence display field, and the above-described setting processing after the value display processing may be performed.

In other words, according to the configuration of this modified embodiment, the adjustment rate of edit column A24 is edited to a value less than 100%, the adjustment target route which moving speed of distal end 91 is reduced is selected, by inputting instruction of main operation, distal end 91 can be moved at a lower speed than the set value in the selected adjustment target route with melt processing. In this case, by moving distal end 91 with molten metal is attached, it is possible to determine whether or not there arises a problem such as adhesion of molten metal to parts on the substrate in the vicinity of distal end 91 during the movement.

Further, when there are a large number of target positions in the melt process, the adjustment rate in edit column A24 is edited to a value greater than 100%, the adjustment target route for which the movement speed of distal end 91 is increased is selected, and the user can input an execution instruction. As a result, it is possible to rapidly perform the melt process at the target position of each melt process by moving distal end 91 at the increased moving speed with respect to the set value while performing the melt process.

(Modification 4)

Edit operation screen W2 (FIG. 11) can be modified to omit boxes C21 to C23. When the user enters adjustment rate R1 in edit field A24 as less than 100%, adjustment request receiving module 16 reduces the movement speed of distal end 91 in all movement paths. The first, second, and third routes are all received as adjustment target routes for reducing the moving speed of distal end 91. The first, second, and third speeds are set to V1×R1, V2×R1, and V3×R1, respectively.

(Modification 5)

In FIGS. 2 and 3, heating tool 9 is a soldering iron for depositing solder. Heating tool 9 may instead be a desoldering device that provides suction to remove bonding material, such as solder. With a desoldering device, the distal end of the desoldering device is at the first point, process control module 12 can control melt processing assembly 3 to cause suction at the end of the desoldering device.

Figure 10A:
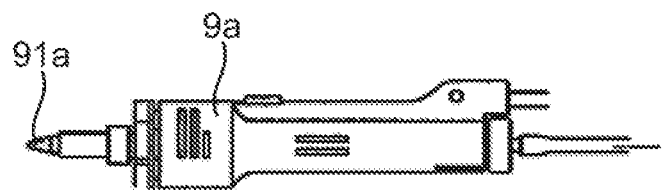
FIG. 10A is an external view of an example heating tool in the form of a suction device.

FIG. 10A is an external view of example desoldering device 9a that can replace the soldering iron in FIGS. 2 and 3. Suction hole 91a in the end of desoldering device 9a is heated by a heater, which melts any bonding material, such as solder, on substrate surface PL. Descriptions above involving distal end 9 also apply to suction hole 91a. Further, an air passageway is provided in the axial direction from the suction hole 91a. By negative pressure suction by a vacuum pump or the like (not shown) being applied to the air passageway, molten bonding material is suctioned into suction hole 91a and the air passageway. With this modification, melt processing assembly 3 may include the vacuum pump.

When the suction hole 91a is at the first point, suction occurs at the suction hole 91a. Thus, the bonding material such as solder at the first point can be melted, suctioned, and removed by the suction hole 91a.

(Modification 6)

Heating tool 9 may instead be a hot air device for blowing hot air to melt bonding material, such as solder. When the distal end of the hot air device is at the first point, process control module 12 can control melt processing assembly 3 to blow out hot air from the soldering tip.

Figure 10B:
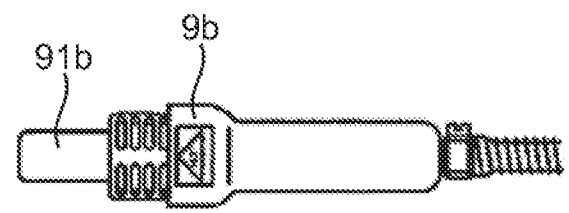
FIG. 10B is an external view of an example heating tool in the form of a hot air device.

FIG. 10B is an external view of example hot air device 9b that can replace the soldering iron in FIGS. 2 and 3. Hot air device 9b heats air that is supplied by a blower (not shown) with heater 2 located within hot air device 9b. Hot air device 9b discharges the heated air from hot air outlet 91b at the distal end of hot air device 9b. The heated air melts bonding material, such as solder. Descriptions above involving distal end 9 also apply to hot air outlet 91b. Also, heater 2 is configured by the heater inside hot air device 9b. With this modification, melt processing assembly 3 may include the blower.

When hot air outlet 91b is at the first point, the hot air is blown out from hot air outlet 91b. Thus, bonding material such as solder at the first point can be melted by the hot air blown out from hot air outlet 91b.

(Modification 7)

Controller 1 may not include functions associated with operation receiving module 15, adjustment request receiving module 16, and trial control module 17. With this modification, trial operation key B6 may not be provided on edit operation screen W1 (FIG. 4).

(Modification 8)

Controller 1 may not include functions associated with recede selection module 14. With this modification, the recede mode selection field may be omitted from edit operation screen W1 (FIG. 4). Step S19 can be omitted from FIG. 6 and FIG. 8, and controller 1 performs either S20 (FIG. 6, FIG. 8) or step S21 (FIG. 6, FIG. 8). If step S21 is performed, distal end 91 is moved upward according to default recede value z0.

(Modification 9)

Controller 1 may not include functions associated with process selection module 13. With this modification, the process mode selection field may be omitted from edit operation screen W1 (FIG. 4). In edit field A2, the user may only edit information for point solder mode. In the melting tool control apparatus 100, the operation of point solder mode shown in FIG. 7 is performed as if the selection of point solder mode is received, but may not perform the operation of drag soldering shown in FIG. 8.

(Modification 10)

Step S18 (FIG. 6) and step S35 (FIG. 8) may be omitted. With this modification, the conditions edit field of edit operation screen W1 (FIG. 4) may not be provided with the after processing condition field.

(Modification 11)

Step S19 to S21 (FIG. 6, FIG. 8) may be omitted.

(Modification 12)

Step S15 (FIG. 6) and step S31 (FIG. 8) may be omitted.

DESCRIPTION OF SYMBOLS

11 receiving module
12 process control module
13 process selection module
14 recede selection module
15 operation receiving module
16 adjustment request receiving module
17 trial control module
3 melt processing assembly
4 drive mechanism
41 first mechanical actuator
42 second mechanical actuator
43 third mechanical actuator
44 fourth mechanical actuator
9 heating tool (soldering iron)
9a heating tool (desoldering tool)
9b heating tool (hot air device)
91 distal end (soldering tip)
91a distal end (suction hole)
91b distal end (hot air outlet)
92 heating tool body
93 solder feeder mechanism
100 melting tool control apparatus
SL solder z0 default recede value
zi customized recede value

What is claimed is:

1. A melting tool control apparatus comprising:
   a drive mechanism configured to move a distal end of a heating tool;
   a melt processing assembly configured to perform a melt process forming a solder point at a point on a substrate using the distal end;
   a receiving module that receives input of a position of the solder point, the solder point comprising three-dimensional coordinate information of a first point where the melt process is to be performed, and input of a position information indicating a position above a surface of the substrate which is different from the first point; and
   a process control module configured to control the melt processing assembly to perform the melt process when the distal end is at the first point,
   wherein the drive mechanism is configured to move the distal end between the position indicated by the position information and the first point.

2. The melting tool control apparatus according to claim 1, wherein
   the position information is three-dimensional coordinate information of a second point that is different from the three-dimensional coordinate information of the first point.

3. The melting tool control apparatus according to claim 1, wherein
   the position information includes distance information indicating a distance from the first point and direction information indicating a direction from the first point, and
   the process control module determines a position for a second point based on the distance information and the direction information, and causes the drive mechanism to move the distal end from the determined position of the second point to the first point.

4. The melting tool control apparatus according to claim 2, further comprising the heating tool, wherein
   the heating tool is a soldering iron, and
   the melt processing assembly performs a principal melt as the melt process when the distal end reaches the first point after moving from the second point, the principal melt process being performed by supplying a principal amount of solder to the distal end.

5. The melting tool control apparatus according to claim 4, wherein
   the process control module further controls the melt processing assembly to perform a preparatory melt process during which a preparatory supply amount of solder is supplied to the distal end when the distal end is at the second point, the preparatory supply amount being less than the principal supply amount.

6. The melting tool control apparatus according to claim 4, wherein
   the process control module controls the drive mechanism to move the distal end to a recede position after completion of the principal melt process, the recede position being at a distance and spaced away from a surface of a substrate on which the principal melt process was performed.

7. The melting tool control apparatus according to claim 4, wherein
   the process control module controls the melt processing assembly to perform a finishing melt process during which a finishing supply amount of solder is by the melt processing assembly to the distal end while keeping the distal end at the first point after completion of the principal melt process, the finishing supply amount being less than the principal supply amount, and
   the process control module controls the drive mechanism to move the distal end to a recede position after completion of the finishing melt process, the recede position being at a distance and spaced away from a surface of a substrate on which the principal melt process was performed.

8. A melting tool control apparatus comprising:
   a drive mechanism configured to move a distal end of a heating tool;
   a melt processing assembly configured to perform a melt process using the distal end;
   a receiving module that receives input of three-dimensional coordinate information of a first point where the melt process is to be performed and input of a position information indicating a position different from the first point;
   a process control module configured to control the melt processing assembly to perform the melt process when the distal end is at the first point; and
   a process selection module that receives a selection between a first process mode in which a solder point is formed at a certain point on a substrate and a second process mode in which a line segment of solder is drawn on a substrate,
   wherein the drive mechanism is configured to move the distal end between the position indicated by the position information and the first point,
   wherein the position information is three-dimensional coordinate information of a second point that is different from the three-dimensional coordinate information of the first point,
   wherein when the process selection module receives the selection of the first process mode, the receiving module receives the first point as an end point to which the distal end is moved and where a solder point is formed, and receives the second point as a start point to which the distal end is moved, and
   when the process selection module receives the selection of the second process mode, the receiving module receives the first point as a start point to which the distal end is moved and where drawing of the line segment is started, and receives the second point as an end point to which the distal end is moved and where drawing of the line segment is ended.

9. The melting tool control apparatus according to claim 4, further comprising
   a recede selection module that receives selection between a first recede mode for returning the distal end to the second point after the principal melt process, and a second recede mode for moving the distal end in a direction perpendicular to and away from a surface of a substrate, wherein
   when the recede selection module receives the selection of the first recede mode, the process control module controls the drive mechanism to return the distal end to the second point after the principal melt process, and
   when the recede selection module receives the selection of the second recede mode, the process control module controls the drive mechanism to move the distal end in the perpendicular direction after the principal melt process.

10. The melting tool control apparatus according to claim 1, further comprising the heating tool, wherein the heating tool is a desoldering device for suctioning and removing bonding material, and when the distal end is at the first point, the process control module controls the melt processing assembly to generate a suction force at the distal end.

11. The melting tool control apparatus according to claim 1, further comprising the heating tool, wherein the heating tool is a hot air device configured to discharge hot air at a temperature that melts bonding material, and when the distal end is at the first point, the process control module controls the melt processing assembly to discharge hot air from the distal end.

12. The melting tool control apparatus according to claim 1, further comprising the heating tool, wherein the heating tool is secured to an arm of a robot that moves the arm along a vertical axis extending in a vertical direction and along a horizontal axis extending in a horizontal axis, and the first point is defined by coordinates on the vertical and horizontal axes.

13. The melting tool control apparatus according to claim 12, wherein the heating tool is held by the arm in an inclined working angle with respect to a surface of a substrate.

14. The melting tool control apparatus according to claim 8, further comprising an operation receiving module that receives an execution instruction to perform a main operation that includes moving the distal end to perform the melt process or an execution instruction to perform a trial operation that includes moving the distal end without performing any melt process; and an adjustment request receiving module that accepts a request to change a moving speed of the distal end from a previously set speed to an adjusted speed for use during the trial operation or the main operation, wherein when the adjustment request receiving module accepts the request, and then the operation receiving module receives the execution instruction to perform the trial operation or the main operation, the drive mechanism uses the adjusted speed to move the distal end.

15. The melting tool control apparatus according to claim 14, wherein the adjustment request receiving module accepts the request to change the moving speed for one or more routes, the routes including a first route from a current position of the distal end to the start point, a second route from the start point to the end point, and a third route from the end point to a recede position located at a distance and spaced away from a surface of the substrate on which the melt process is performed, and the drive mechanism moves the distal end at the adjusted speed in the one or more routes for which the adjustment request receiving module accepted the request to change the moving speed.

* * * * *